US009073525B2

(12) United States Patent
Fukasawa et al.

(10) Patent No.: US 9,073,525 B2
(45) Date of Patent: Jul. 7, 2015

(54) BRAKE APPARATUS BRAKE CONTROL APPARATUS, AND BRAKE CONTROL METHOD

(75) Inventors: Tsukasa Fukasawa, Nishikamo-gun (JP); Takahiro Okano, Toyota (JP); Daisuke Nakata, Toyota (JP); Eiji Nakamura, Nishikamo-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 852 days.

(21) Appl. No.: 12/669,905

(22) PCT Filed: Jul. 18, 2008

(86) PCT No.: PCT/IB2008/001875
§ 371 (c)(1),
(2), (4) Date: Jan. 20, 2010

(87) PCT Pub. No.: WO2009/013586
PCT Pub. Date: Jan. 29, 2009

(65) Prior Publication Data
US 2010/0219026 A1    Sep. 2, 2010

(30) Foreign Application Priority Data
Jul. 20, 2007 (JP) ................................ 2007-189840

(51) Int. Cl.
*B60T 13/00* (2006.01)
*B60T 8/36* (2006.01)
*B60T 8/40* (2006.01)

(52) U.S. Cl.
CPC ................. *B60T 8/36* (2013.01); *B60T 8/4081* (2013.01)

(58) Field of Classification Search
CPC ............. B60T 8/36; B60T 8/38; B60T 8/361; B60T 8/4266
USPC ............. 303/20, 60, 113.4, 119.1–119.2, 155
See application file for complete search history.

(56) References Cited

U.S. PATENT DOCUMENTS 6,019,441 A *  2/2000  Lloyd et al. .................... 303/156
6,155,654 A * 12/2000  Oyama ........................ 303/117.1
(Continued)

FOREIGN PATENT DOCUMENTS

DE    10 2005 046 055    3/2007
DE    10 2005 056 210    5/2007
(Continued)

OTHER PUBLICATIONS

See abstract and machine translation of JP 2006-175887.*
See abstract and machine translation of JP 2005-038314.*

*Primary Examiner* — Robert A Siconolfi
*Assistant Examiner* — Mahbubur Rashid
(74) *Attorney, Agent, or Firm* — Oblon, McClelland, Maier & Neustadt, L.L.P.

(57) ABSTRACT

In a brake apparatus, an activation current for opening a simulator cut valve from a closed state is applied, whereupon a steady-state current is applied continuously to maintain the open state. A brake control apparatus and a brake control method are employed to perform control in which a valve opening current, which is higher than the steady-state current, is applied to the simulator cut valve every time a brake pedal is depressed. Thus, in a brake apparatus including a switch valve that is driven steadily by applying the steady-state current thereto, favorable control responsiveness can be maintained in the switch valve at all times while achieving a reduction in power consumption.

26 Claims, 11 Drawing Sheets

(56) References Cited

U.S. PATENT DOCUMENTS

| | | |
|---|---|---|
| 6,189,982 B1 * | 2/2001 | Harris et al. ............... 303/116.1 |
| 6,450,587 B1 * | 9/2002 | MacGregor et al. ............ 303/89 |
| 6,504,699 B1 * | 1/2003 | Rader et al. .................. 361/155 |
| 2004/0012258 A1 * | 1/2004 | Hosoi et al. ................. 303/119.2 |
| 2005/0275286 A1 | 12/2005 | Ohmori et al. |
| 2006/0158032 A1 * | 7/2006 | Miyazaki et al. ............. 303/155 |
| 2006/0238024 A1 * | 10/2006 | Akita ........................... 303/155 |

FOREIGN PATENT DOCUMENTS

| | | |
|---|---|---|
| JP | 2005-38314 A | 2/2005 |
| JP | 2006 17181 | 1/2006 |
| JP | 2006 175887 | 7/2006 |
| JP | 2006-256450 A | 9/2006 |
| JP | 2006-528581 A | 12/2006 |
| JP | 2007-91029 A | 4/2007 |

* cited by examiner

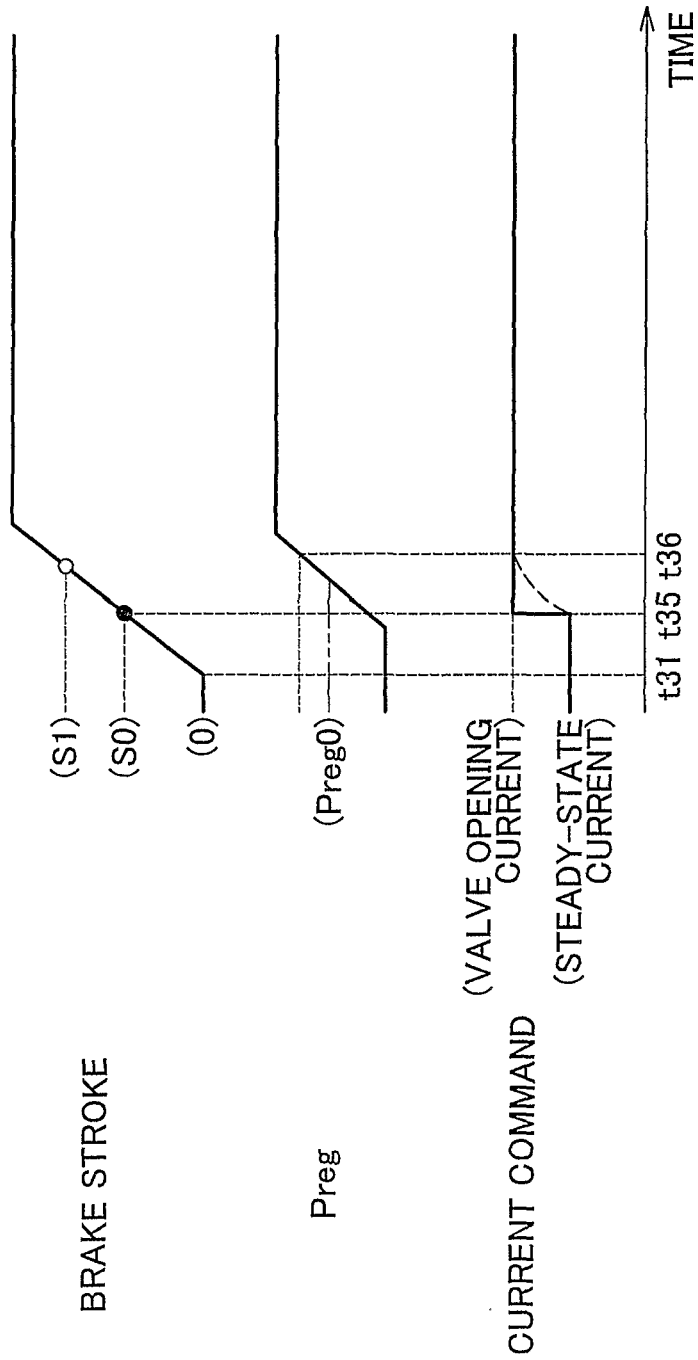

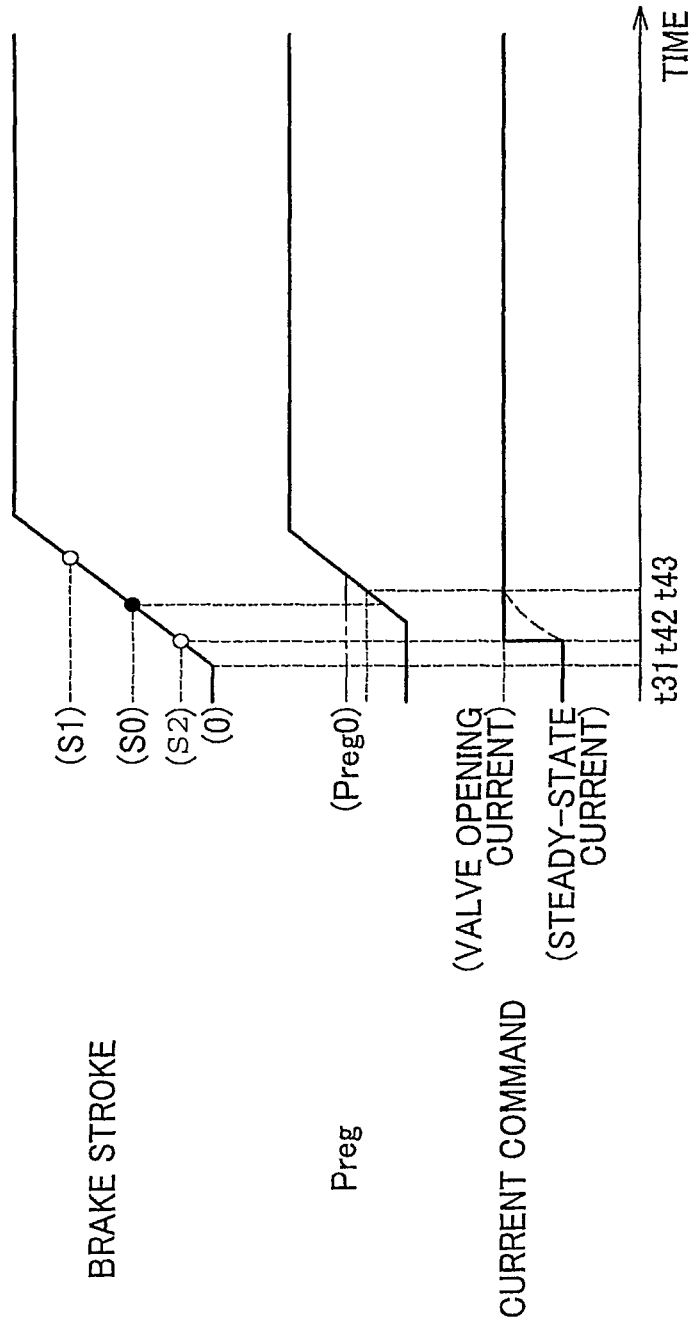

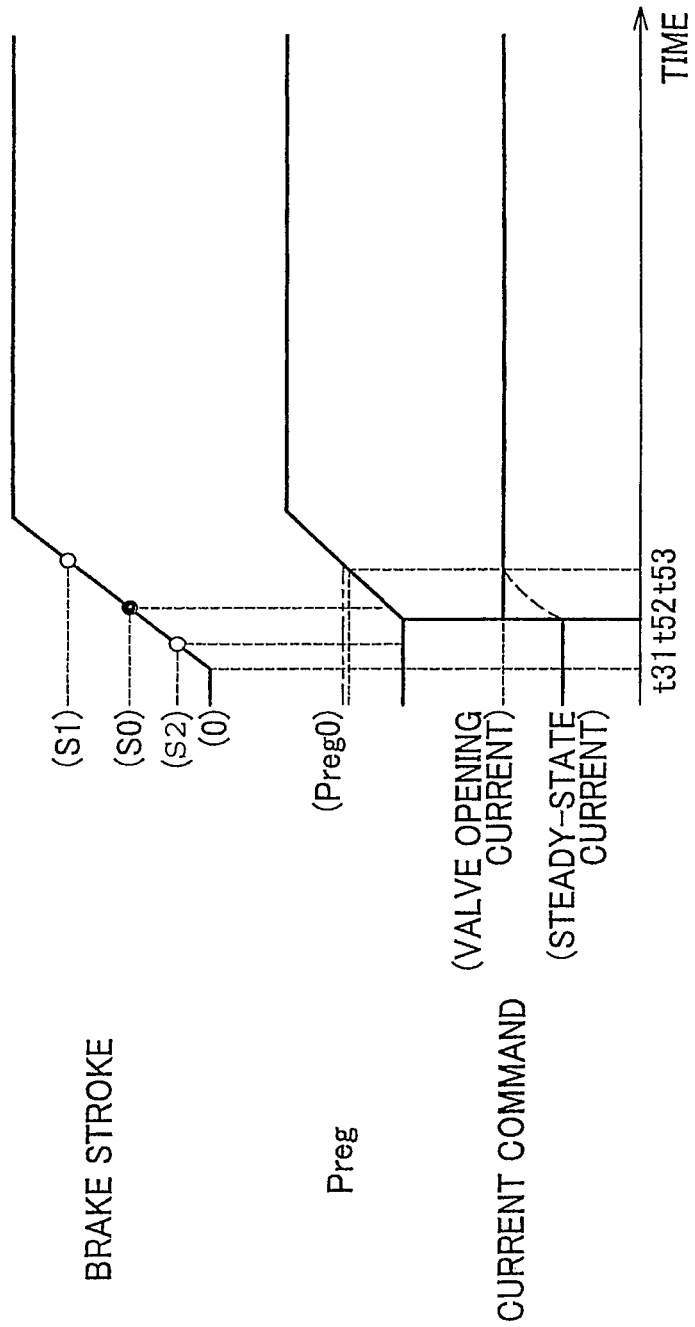

BRAKE APPARATUS BRAKE CONTROL APPARATUS, AND BRAKE CONTROL METHOD

The disclosure of Japanese Patent Application No. 2007-189840 filed on Jul. 20, 2007, including the specification, drawings and abstract is incorporated herein by reference in its entirety.

BACKGROUND OF THE INVENTION

1. Field of the Invention

The present invention relates to brake control for controlling a braking force applied to a wheel of a vehicle.

2. Description of the Related Art

A brake apparatus that generates hydraulic pressure corresponding to an operation of a brake pedal in a hydraulic circuit and applies a braking force to a wheel by supplying the hydraulic pressure to a wheel cylinder is conventionally available. A plurality of electromagnetic valves are provided in the hydraulic circuit, and by open/close controlling each electromagnetic valve so as to adjust supply/discharge amounts of a working fluid to/from the wheel cylinder, the hydraulic pressure is controlled such that an appropriate braking force is applied to each wheel.

This type of electromagnetic valve includes an electromagnetic valve that is maintained in a driven state by applying a steady-state current, which is lower than an activation current, thereto steadily following application of the activation current so as to achieve an improvement in controllability and a reduction in power consumption. This characteristic is seen in switch valves such as a normally open master cylinder cut valve for connecting or disconnecting a master cylinder and a wheel cylinder, a normally closed simulator cut valve for connecting or disconnecting the master cylinder and a stroke simulator, and a normally closed isolation valve for connecting or disconnecting a front wheel side hydraulic passage and a rear wheel side hydraulic passage, for example (see Japanese Patent Application Publication No. 2006-17181 (JP-A-2006-17181), for example).

For example, a normally closed switch valve is opened by applying an activation current thereto when a vehicle is driven, and then maintained in a predetermined open state by maintaining a constant steady-state current. This is achieved using hysteresis in the opening characteristic of the switch valve, which enables the switch valve to be held in an open state at a lower current value once the switch valve has been opened. By maintaining the open state in this manner, the required hydraulic pressure can be supplied as soon as a brake pedal is depressed, and as a result, control responsiveness can be maintained at a favorable level. Meanwhile, since the switch valve is held at a lower steady-state current than the activation current, a reduction in power consumption can be achieved in comparison with a case in which the activation current is maintained at all times.

However, this type of switch valve uses a power supply source that is shared by other control applications. Therefore, the valve may close due to a voltage reduction occurring when the electrical load temporarily increases, for example when an air-conditioning apparatus is activated or headlights are switched ON. When the switch valve temporarily closes in this manner, it may be impossible to open the valve using the valve opening characteristic described above by applying the steady-state current alone. In a case where a simulator cut valve is closed in this manner, for example, a stroke simulator cannot function sufficiently well when the driver depresses the brake pedal, and as a result, the pedal feeling deteriorates.

Further, when an isolation valve is closed in this manner in a case where vehicle travel control is performed automatically, for example, the required working fluid is not supplied to the respective wheels, leading to deterioration of the control performance. With respect to a normally open switch valve, on the other hand, the valve is operated in a closing direction by the activation current and maintained in a closed state by the subsequent steady-state current, but when the valve opens due to a temporary voltage reduction, as described above, similar problems may occur.

SUMMARY OF THE INVENTION

In consideration of the problems described above, the present invention provides a brake control technique for a brake apparatus including a switch valve that is driven steadily by applying a steady-state current thereto, with which a reduction in power consumption can be achieved while maintaining favorable control responsiveness in the switch valve at all times.

An aspect of the present invention provides a brake apparatus having: a hydraulic pressure source that generates hydraulic pressure by pressurizing a working fluid in accordance with an operation of a brake operating member; a wheel cylinder that applies a braking force to a wheel upon reception of a supply of the hydraulic pressure of the working fluid; a hydraulic circuit that connects the hydraulic pressure source to the wheel cylinder and supplies the hydraulic pressure generated by the hydraulic pressure source to the wheel cylinder; a switch valve that is disposed in the hydraulic circuit and opens and closes when a current is applied thereto so as to switch a flow of the working fluid through the hydraulic circuit; a brake operation determination unit that determines an operation condition of the brake operating member; and a control unit that performs control to apply a first current, which is required to start an open/close operation, to the switch valve and then apply a second current, which is lower than the first current, to maintain the open/close operation, and performs control to apply a control securing current, which is higher than the second current, to the switch valve when the brake operation determination unit determines that the brake operating member is in an operational condition during application of the second current.

Here, the "switch valve" is constituted by a so-called electromagnetic valve having a valve portion that is open/close controlled in accordance with an externally supplied current value so as to switch a working fluid passage, and may include the aforementioned normally open master cylinder cut valve, normally closed simulator cut valve, isolation valve, and so on, for example. The "brake operating member" is a member that can be operated by a driver to cause a brake to function, and includes a brake pedal.

According to the brake apparatus described above, the first current required to start the open/close operation is applied to the switch valve, whereupon the second current for maintaining the open/close operation is applied continuously. By applying the second current steadily after the start of the open/close operation of the switch valve in this manner, favorable control responsiveness can be maintained in the switch valve. Meanwhile, by setting the second current lower than the first current, the application of a larger current than necessary can be suppressed, enabling a reduction in power consumption. In particular, when it is determined that the brake operating member is in an operational condition, the control securing current, which is higher than the second current, is applied to the switch valve. Hence, even when the voltage of the drive power source decreases momentarily during supply of the steady-state current, the control securing current is supplied during an operation of the brake operating member, and therefore a stable open/close operation is secured. Once a stable open/close operation state has been secured, the current is switched back to the second current. Thus, a reduction in power consumption can be achieved while maintaining favorable control responsiveness in the switch valve at all times.

Another aspect of the present invention provides a brake control apparatus that performs electrification control on a switch valve and is provided in a brake apparatus having a hydraulic pressure source that generates hydraulic pressure by pressurizing a working fluid in accordance with an operation of a brake operating member, a wheel cylinder that applies a braking force to a wheel upon reception of a supply of the hydraulic pressure of the working fluid, a hydraulic circuit that connects the hydraulic pressure source to the wheel cylinder and supplies the hydraulic pressure generated by the hydraulic pressure source to the wheel cylinder, and the switch valve, which is disposed in the hydraulic circuit and opens and closes when a current is applied thereto so as to switch a flow of the working fluid through the hydraulic circuit. The brake control apparatus includes: a brake operation determination unit that determines an operation condition of the brake operating member; and a control unit that performs control to apply a first current, which is required to start an open/close operation, to the switch valve and then apply a second current, which is lower than the first current, to maintain the open/close operation, and performs control to apply a control securing current, which is higher than the second current, to the switch valve when the brake operation determination unit determines that the brake operating member is in an operational condition during application of the second current.

By applying the brake control apparatus to a brake apparatus in the manner described above, a reduction in power consumption can be achieved while maintaining favorable control responsiveness in the switch valve provided in the brake apparatus at all times.

A further aspect of the present invention provides a brake control method for controlling electrification of a switch valve disposed in a hydraulic circuit of a brake apparatus on the basis of an operation of a brake operating member to switch a flow of a working fluid through the hydraulic circuit, including: a drive starting step for applying a first current, which is required to start an open/close operation, to the switch valve when a vehicle is driven; a drive maintaining step for applying a second current, which is lower than the first current, to maintain the open/close operation of the switch valve following the drive starting step; and a control securing step for applying a control securing current, which is higher than the second current, to the switch valve for a preset time period when the brake operating member is determined to be in an operational condition during application of the second current in the drive maintaining step.

By applying the brake control method to a brake apparatus in the manner described above, a reduction in power consumption can be achieved while maintaining favorable control responsiveness in the switch valve provided in the brake apparatus at all times.

The "brake operation determination unit" of the brake apparatus and brake control apparatus described above may determine the operation condition on the basis of detection information from a brake operation detection unit constituted by a sensor or the like, or may determine the operation condition on the basis of information transmitted from another functional unit of the vehicle. Examples of the former include a stroke sensor that detects a depression amount of a brake pedal (brake stroke) in a direct analog fashion, a brake switch that detects depression of the brake pedal and a depression position, or a hydraulic sensor that detects or calculates the depression amount of the brake pedal indirectly from the hydraulic pressure of the working fluid, which varies in accordance with depression of the brake pedal. Examples of the latter include a device that estimates the depression amount of the brake pedal indirectly from transmission information transmitted by the control unit for performing vehicle control.

Note, however, that when the control unit outputs a command signal to supply the control securing current, a time delay may occur in the rise of the current. Therefore, the control unit may perform control to apply the control securing current to the switch valve for a predetermined electrification period following the elapse of a preset setting period that starts from the point at which the brake operation detection unit detects that the brake operating member has shifted from an operative state to an inoperative state. By performing this control, the control securing current is more likely to reach its target current value at the same time as the brake operating member is operated.

In the brake apparatus and brake control apparatus described above, when the brake pedal is depression rapidly in accordance with an emergency braking request, for example, the open/close operation of the switch valve must be performed in accordance with the rapid depression. However, a time delay may occur between issuing a command to apply the control securing current during electrification control of the switch valve and actually supplying the target current value.

Therefore, a stroke detection unit that detects a brake stroke indicating a depression amount of a brake pedal serving as the brake operating member may also be provided. Furthermore, the control unit may determine whether or not the brake pedal has been depressed rapidly during application of the second current on the basis of a preset rapid depression determination reference, and in a case where the brake pedal is determined to have been depressed rapidly, the control unit may determine that the brake pedal is in the operational condition upon detection of a smaller brake stroke than that of a case in which rapid depression is not determined.

Here, the "rapid depression determination reference" may be set in relation to temporal variation in the depression amount of the brake pedal (the depression speed). In this case, rapid depression is determined to have occurred when the depression speed is higher than a determination reference value. For example, the depression speed may be detected immediately after the brake pedal is depressed, and when the depression speed increases above the rapid depression determination reference value, it may be determined that the brake pedal has been operated by a smaller brake stroke than usual. Note that an operation of the brake pedal is determined after the brake pedal has been depressed in consideration of play and so on in the brake pedal operation. More specifically, during brake control, an operation of the brake pedal is typically determined to have occurred when the brake pedal is depressed by a predetermined amount. The reason for this is to cut noise generated when the brake pedal is displaced by vibration or the like as the vehicle is driven, for example. In this aspect, the typically provided brake pedal depression determination reference is made smaller than usual during rapid depression so that depression of the brake pedal can be determined earlier.

Thus, the control securing current can be supplied to the switch valve quickly during rapid depression of the brake pedal. As a result, the open/close operation of the switch valve can be performed in accordance with the rapid depression, whereby the responsiveness of the operation can be secured.

The brake apparatus and brake control apparatus described above may also be provided with a first hydraulic circuit serving as the hydraulic circuit, which connects the hydraulic pressure source to the switch valve; a first hydraulic pressure detection unit that detects a hydraulic pressure in the first hydraulic circuit; a second hydraulic circuit that is connected at one end to the first hydraulic circuit side via a predetermined pressure reduction unit and connected at another end to the wheel cylinder side; and a second hydraulic pressure detection unit that detects a hydraulic pressure in the second hydraulic circuit. Here, the brake operation determination unit may determine the operation condition of the brake operating member on the basis of detection information from both the first hydraulic pressure detection unit and the second hydraulic pressure detection unit when a hydraulic pressure rate of change detected by the first hydraulic pressure detection unit is equal to or smaller than a preset rapid depression determination reference value for determining whether or not a brake pedal serving as the brake operating member has been depressed rapidly, and may determine the operation condition of the brake pedal on the basis of only the detection information of the first hydraulic pressure detection unit when the hydraulic pressure rate of change detected by the first hydraulic pressure detection unit is larger than the rapid depression determination reference value.

In this case, the first hydraulic circuit and second hydraulic circuit are provided as hydraulic circuits. The switch valve is disposed in the first hydraulic circuit, and the pressure reduction unit, which serves as flow resistance, exists between the two hydraulic circuits. The pressure reduction unit may be another electromagnetic valve, or a throttle unit such as an orifice having a fixed passage cross-section. The switch valve is biased toward an operation stopping side by the front-rear differential pressure thereof, and biased toward the open/close operation side when the control securing current is applied. In a normal control state, an operation of the brake pedal is determined to have occurred when the hydraulic pressure of the two hydraulic circuits rises, thereby ensuring that control is performed reliably.

With this constitution, the hydraulic pressure of the second hydraulic circuit increases more slowly than the hydraulic pressure of the first hydraulic circuit due to the existence of the pressure reduction unit. In particular, a relative increase occurs in this time delay when the brake pedal is depressed rapidly. Therefore, when an operation of the brake pedal is determined on the basis of detection information from both of the hydraulic circuits, as described above, the hydraulic pressure of the first hydraulic circuit may have already increased greatly at the time of the determination. As a result, the front-rear differential pressure of the switch valve increases such that the switch valve may be unable to shift to the open/close operation state even upon application of the control securing current.

In this case, the operation condition of the brake pedal is determined on the basis of the detection information from the first hydraulic circuit alone during rapid depression. Thus, in a situation where a high demand for braking is envisaged, the responsiveness of the brake control can be secured. During normal control without rapid depression, on the other hand, the operation condition of the brake pedal is determined on the basis of the detection information from both the first hydraulic circuit and second hydraulic circuit. As a result, the reliability of the control can be secured. In other words, responsiveness can be emphasized during rapid depression control, which is performed comparatively infrequently, while reliability can be emphasized during normal control, and therefore balanced control corresponding to conditions can be realized.

Further, a first hydraulic circuit serving as the hydraulic circuit, which connects the hydraulic pressure source to the switch valve; a first hydraulic pressure detection unit that detects a hydraulic pressure in the first hydraulic circuit; a second hydraulic circuit that is connected at one end to the first hydraulic circuit side via a predetermined pressure reduction unit and connected at another end to the wheel cylinder side; a second hydraulic pressure detection unit that detects a hydraulic pressure in the second hydraulic circuit; and a stroke detection unit that detects a brake stroke indicating a depression amount of a brake pedal serving as the brake operating member, may be provided. Further, the brake operation determination unit may determine that the brake pedal is in the operational condition when a preset reference brake stroke for determining rapid depression is detected and the hydraulic pressure detected by the first hydraulic pressure detection unit is larger than a reference pressure.

Here, the "reference brake stroke" is preset such that when rapid depression is not performed, the hydraulic pressure detected by the first hydraulic pressure detection unit is equal to or smaller than the reference pressure, and when rapid depression is performed, the hydraulic pressure detected by the first hydraulic pressure detection unit becomes larger than the reference pressure. Atmospheric pressure or the like may be set as the reference pressure.

In this case, control is realized by a simple algorithm, according to which the control securing current is supplied when the brake pedal is at the reference brake stroke and the hydraulic pressure is greater than the reference pressure. Further, even when the brake pedal is depressed rapidly, the open/close operation of the switch valve can be performed in accordance therewith.

Alternatively, an accelerator operation detection unit that detects an operation state of an accelerator operating member of the vehicle may be provided. Further, the brake operation determination unit may determine that the brake operating member is in the operational condition when a shift from an operative state to an inoperative state is detected in the accelerator operating member.

Here, the "accelerator operating member" is a member that can be operated by the driver to cause the vehicle to travel, and includes an accelerator pedal. The "accelerator operation detection unit" includes a sensor or the like for detecting the accelerator opening.

More specifically, a brake operation is likely to be performed after the accelerator pedal or the like is switched OFF. In consideration of this point, an operation of the brake operating member is determined in advance when the accelerator operating member enters an inoperative state, and the control securing current is applied accordingly.

A further aspect of the present invention provides a brake apparatus having: a hydraulic pressure source that generates hydraulic pressure by pressurizing a working fluid in accordance with an operation of an operating member; a wheel cylinder that applies a braking force to a wheel upon reception of a supply of the hydraulic pressure of the working fluid; a hydraulic circuit that connects the hydraulic pressure source to the wheel cylinder and supplies the hydraulic pressure generated by the hydraulic pressure source to the wheel cylinder; a switch valve that is disposed in the hydraulic circuit and opens and closes when a current is applied thereto so as to switch a flow of the working fluid through the hydraulic circuit; a state detection unit that detects a control state of a vehicle; and a control unit that performs control to apply a first current, which is required to start an open/close operation, to the switch valve and then apply a second current, which is lower than the first current, to maintain the open/close operation, and performs control to apply a control securing current, which is higher than the second current, to the switch valve when a preset shift anticipation condition, which serves as a determination reference for anticipating a shift to specific vehicle travel control performed in tandem with braking control of the vehicle, is determined to have been established on the basis of the control state detected by the state detection unit during application of the second current.

Here, the "specific vehicle travel control" includes Traction Control (TRC) for suppressing spinning of the drive wheels during advancement and acceleration of the vehicle, Vehicle Stability Control (VSC) for suppressing side slipping of the wheels when the vehicle turns, and cruise control for running the vehicle while maintaining a fixed inter-vehicle distance to the preceding vehicle, for example. The "state detection unit" detects the control state of the vehicle, which serves as a condition for executing this vehicle travel control. The "shift anticipation condition" may be a condition for executing the specific vehicle travel control itself, or may be set as a condition indicating a prior stage to establishment of the execution condition, as appropriate. In other words, the shift anticipation condition may be set as a condition for anticipating a shift to the specific vehicle travel control as the execution condition approaches. The "switch valve" and "control securing current" are as described above.

According to the brake apparatus described above, when it is determined that the shift anticipation condition for anticipating a shift to specific vehicle travel control has been established, the control securing current is applied to the switch valve. In other words, by applying the control securing current in advance when subsequent braking control is predicted, regardless of whether or not the brake operating member has been operated, favorable responsiveness can be secured when braking control is actually performed. Furthermore, the second current is maintained prior to establishment of the shift anticipation condition and after stable braking control has been secured during the vehicle travel control, and therefore a reduction in power consumption can also be achieved.

A further aspect of the present invention provides a brake control apparatus that performs electrification control on a switch valve and is provided in a brake apparatus having a hydraulic pressure source that generates hydraulic pressure by pressurizing a working fluid in accordance with an operation of a brake operating member, a wheel cylinder that applies a braking force to a wheel upon reception of a supply of the hydraulic pressure of the working fluid, a hydraulic circuit that connects the hydraulic pressure source to the wheel cylinder and supplies the hydraulic pressure generated by the hydraulic pressure source to the wheel cylinder, and the switch valve, which is disposed in the hydraulic circuit and opens and closes when a current is applied thereto so as to switch a flow of the working fluid through the hydraulic circuit. The brake control apparatus includes: a state detection unit that detects a control state of a vehicle; and a control unit that performs control to apply a first current, which is required to start an open/close operation, to the switch valve and then apply a second current, which is lower than the first current, to maintain the open/close operation, and performs control to apply a higher current than the second current to the switch valve when a preset shift anticipation condition, which serves as a determination reference for anticipating a shift to specific vehicle travel control performed in tandem with braking control of the vehicle, is determined to have been established on the basis of the control state detected by the state detection unit during application of the second current.

By applying the brake control apparatus to a brake apparatus in the manner described above, a reduction in power consumption can be achieved while maintaining favorable control responsiveness in the switch valve provided in the brake apparatus at all times.

A further aspect of the present invention provides a brake control method for controlling electrification of a switch valve disposed in a hydraulic circuit of a brake apparatus on the basis of an operation of a brake operating member to switch a flow of a working fluid through the hydraulic circuit, including: a drive starting step for applying a first current, which is required to start an open/close operation, to the switch valve when a vehicle is driven; a drive maintaining step for applying a second current, which is lower than the first current, to maintain the open/close operation of the switch valve following the drive starting step; and a control securing step for applying a control securing current, which is higher than the second current, to the switch valve for a preset time period when a preset shift anticipation condition for anticipating a shift to specific vehicle travel control performed in tandem with braking control of the vehicle is established during application of the second current in the drive maintaining step.

By applying the brake control method to a brake apparatus in the manner described above, a reduction in power consumption can be achieved while maintaining favorable control responsiveness in the switch valve provided in the brake apparatus at all times.

In the brake apparatuses, brake control apparatuses, and brake control methods described above, the "control securing current" is preferably the first current, at which the switch valve is reliably caused to perform an open/close operation, but as long as long as the open/close operation can be performed in the switch valve, the control securing current may be a preset current that is higher than the second current and lower than the first current. Note that the control securing current may be switched back to the second current once a stable open/close state has been secured in the switch valve following the elapse of a predetermined time period from the point at which the control securing current is supplied.

According to the present invention, a reduction in power consumption can be achieved in a brake apparatus including a switch valve that is driven steadily by applying a steady-state current thereto while maintaining favorable control responsiveness in the switch valve at all times.

BRIEF DESCRIPTION OF THE DRAWINGS

The features, advantages, and technical and industrial significance of this invention will be better understood by reading the following detailed description of preferred embodiments of the invention, when considered in connection with the accompanying drawings, in which:

FIG. 8B is an illustrative view showing problems occurring when the valve opening current is applied in the first embodiment, in a case where the brake pedal is depressed rapidly;

FIG. 9 is an illustrative view showing electrification control according to a fifth embodiment; and FIG. 10 is an illustrative view showing electrification control according to a sixth embodiment.

DETAILED DESCRIPTION OF THE EMBODIMENTS

In the following description and the accompanying drawings, the present invention will be described in greater detail with reference to example embodiments.

Figure 1:
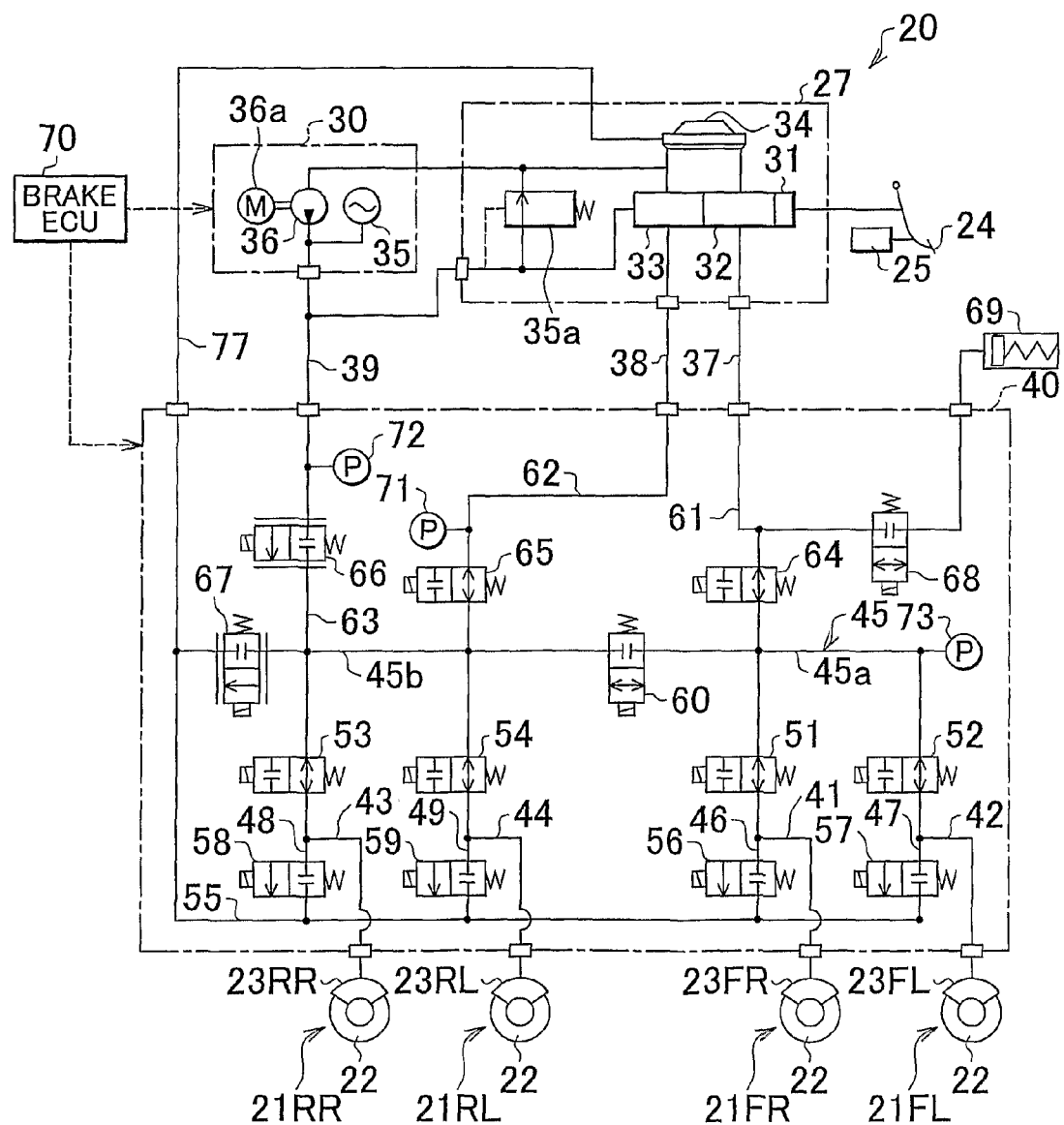
FIG. 1 is a system diagram showing a brake apparatus according to a first embodiment.

First, a first embodiment of the present invention will be described. FIG. 1 is a system diagram showing a brake apparatus according to the first embodiment of the present invention. A brake apparatus 20 constitutes an Electronic Control Brake system (ECB) for a vehicle, and controls a braking force applied to four wheels provided on the vehicle. The brake apparatus 20 is installed in a hybrid vehicle having an electric motor and an internal combustion engine as travel drive sources, for example. In this type of hybrid vehicle, both regenerative braking, in which the vehicle is braked by regenerating the kinetic energy of the vehicle as electric energy, and hydraulic braking performed by the brake apparatus 20, may be used to brake the vehicle. The vehicle of this embodiment is capable of executing brake regeneration cooperative control using both regenerative braking and hydraulic braking to generate a desired braking force.

The brake apparatus 20 includes disc brake units 21FR, 21FL, 21RR and 21RL provided in accordance with the wheels, a master cylinder unit 27, a power hydraulic pressure source 30, a hydraulic actuator 40, and a hydraulic circuit connecting these components.

The disc brake units 21FR, 21FL, 21RR and 21RL apply a braking force to a right front wheel, a left front wheel, a right rear wheel and a left rear wheel of the vehicle, respectively. The master cylinder unit 27, which serves as a manual hydraulic pressure source, delivers brake fluid, which serves as a working fluid that is pressurized in accordance with an operation amount applied by a driver to a brake pedal 24 serving as a brake operating member, to the disc brake units 21FR to 21RL. The power hydraulic pressure source 30 is capable of delivering brake fluid that has been pressurized through power supply to the disc brake units 21FR to 21RL independently of an operation of the brake pedal 24 by the driver. The hydraulic actuator 40 adjusts the hydraulic pressure of the brake fluid supplied from the power hydraulic pressure source 30 or the master cylinder unit 27 appropriately and then delivers the brake fluid to the disc brake units 21FR to 21RL. Thus, the braking force applied to the respective wheels through hydraulic braking is adjusted.

The disc brake units 21FR to 21RL respectively include a brake disc 22 and a wheel cylinder 23FR to 23RL installed in a brake caliper. The wheel cylinders 23FR to 23RL are connected to the hydraulic actuator 40 via different hydraulic passages. Note that in the following description, the wheels cylinders 23FR to 23RL will be referred to together as a "wheel cylinder 23" where appropriate.

When the brake fluid is supplied to the wheel cylinder 23 from the hydraulic actuator 40 in the disc brake units 21FR to 21RL, a brake pad serving as a friction member is pressed against the brake disc 22 that rotates together with the wheel. As a result, a braking force is applied to the respective wheels. Note that in this embodiment, the disc brake units 21FR to 21RL are used, but another braking force application mechanism including the wheel cylinder 23, such as a drum brake, for example, may be used.

In this embodiment, the master cylinder unit 27 is a master cylinder having a hydraulic booster, and includes a hydraulic booster 31, a master cylinder 32, a regulator 33, and a reservoir 34. Input from the driver is transmitted to the brake pedal 24 mechanically such that the brake fluid in the master cylinder 32 is pressurized. The hydraulic booster 31 is connected to the brake pedal 24 so as to amplify a pedal depression force applied to the brake pedal 24 and transmit the amplified pedal depression force to the master cylinder 32. The pedal depression force is amplified by supplying brake fluid from the power hydraulic pressure source 30 to the hydraulic booster 31 via the regulator 33. The master cylinder 32 generates a master cylinder pressure having a predetermined magnification ratio relative to the pedal depression force.

The reservoir 34 storing the brake fluid is disposed above the master cylinder 32 and the regulator 33. The master cylinder 32 communicates with the reservoir 34 when depression of the brake pedal 24 is released. The regulator 33, on the other hand, communicates with both the reservoir 34 and an accumulator 35 of the power hydraulic pressure source 30, and generates a substantially equal hydraulic pressure to the master cylinder pressure using the reservoir 34 as a low pressure source and the accumulator 35 as a high pressure source. Hereafter, the hydraulic pressure of the regulator 33 will be referred to as "regulator pressure" where appropriate. Note that the master cylinder pressure and the regulator pressure do not have to be perfectly identical, and the master cylinder unit 27 may be designed such that the regulator pressure is slightly higher than the master cylinder pressure, for example.

The power hydraulic pressure source 30 includes the accumulator 35 and a pump 36. The accumulator 35 converts the pressure energy of the brake fluid, which is raised by the pump 36, into the pressure energy of a filler gas such as nitrogen at approximately 14 to 22 MPa, for example, and accumulates this pressure energy. The pump 36 includes a motor 36a as a drive source, and has a suction inlet connected to the reservoir 34 and a discharge outlet connected to the accumulator 35. The accumulator 35 is also connected to a relief valve 35a provided in the master cylinder unit 27. When the pressure of the brake fluid within the accumulator 35 increases abnormally to approximately 25 MPa, for example, the relief valve 35a opens, whereby the high-pressure brake fluid is returned to the reservoir 34.

As described above, the brake apparatus 20 is provided with the master cylinder 32, the regulator 33, and the accumulator 35 as a brake fluid supply source for supplying the brake fluid to the wheel cylinder 23. The master cylinder 32 is connected to a master pipe 37, the regulator 33 is connected to a regulator pipe 38, and the accumulator 35 is connected to an accumulator pipe 39. The master pipe 37, regulator pipe 38, and accumulator pipe 39 are respectively connected to the hydraulic actuator 40.

The hydraulic actuator 40 includes an actuator block formed with a plurality of channels, and a plurality of electromagnetic control valves. The channels formed in the actuator block include individual channels 41, 42, 43 and 44, and a main channel 45. The individual channels 41 to 44 bifurcate from the main channel 45 and are connected to the wheel cylinders 23FR, 23FL, 23RR and 23RL of the corresponding disc brake units 21FR, 21FL, 21RR and 21RL, respectively. This enables the respective wheel cylinders 23 to communicate with the main channel 45.

Further, ABS holding valves 51, 52, 53 and 54 are provided in midway positions of the individual channels 41, 42, 43 and 44, respectively. The ABS holding valves 51 to 54 are each provided with an ON/OFF controlled solenoid and a spring, and are all constituted by normally open electromagnetic control valves that are open when the solenoid is not electrified. When in an open state, the ABS holding valves 51 to 54 are capable of allowing bidirectional passage of the brake fluid. In other words, the brake fluid is allowed to flow from the main channel 45 to the wheel cylinder 23 and in the opposite direction, i.e. from the wheel cylinder 23 to the main channel 45. When the ABS holding valves 51 to 54 are closed following electrification of the solenoid, the flow of brake fluid through the individual channels 41 to 44 is interrupted.

The wheel cylinder 23 is connected to a reservoir channel 55 via pressure reduction channels 46, 47, 48 and 49 that are respectively connected to the individual channels 41 to 44. ABS pressure reduction valves 56, 57, 58 and 59 are provided in midway positions of the pressure reduction channels 46, 47, 48 and 49. The ABS pressure reduction valves 56 to 59 are each provided with an ON/OFF controlled solenoid and a spring, and are all constituted by normally closed electromagnetic control valves that are closed when the solenoid is not electrified. When the ABS pressure reduction valves 56 to 59 are in a closed state, the flow of brake fluid through the pressure reduction channels 46 to 49 is interrupted. When the solenoid is electrified such that the ABS pressure reduction valves 56 to 59 open, the brake fluid is allowed to flow through the pressure reduction channels 46 to 49, whereby the brake fluid circulates from the wheel cylinder 23 to the reservoir 34 via the pressure reduction channels 46 to 49 and the reservoir channel 55. Note that the reservoir channel 55 is connected to the reservoir 34 of the master cylinder unit 27 via a reservoir pipe 77.

An isolation valve 60 is provided in a midway position on the main channel 45. The isolation valve 60 divides the main channel 45 into a first channel 45a, which is connected to the individual channels 41 and 42, and a second channel 45b, which is connected to the individual channels 43 and 44. The first channel 45a is connected to the wheel cylinders 23FR and 23FL of the front wheels via the individual channels 41 and 42, and the second channel 45b is connected to the wheel cylinders 23RR and 23RL of the rear wheels via the individual channels 43 and 44.

The isolation valve 60 has an ON/OFF controlled solenoid and a spring, and is constituted by a normally closed switch valve that is closed when the solenoid is not electrified. When the isolation valve 60 is in a closed state, the flow of brake fluid through the main channel 45 is interrupted. When the solenoid is electrified such that the isolation valve 60 opens, the brake fluid is allowed to flow bidirectionally between the first channel 45a and the second channel 45b.

Further, a master channel 61 and a regulator channel 62, both of which communicate with the main channel 45, are formed in the hydraulic actuator 40. More specifically, the master channel 61 is connected to the first channel 45a of the main channel 45, and the regulator channel 62 is connected to the second channel 45b of the main channel 45. The master channel 61 is also connected to the master pipe 37 that communicates with the master cylinder 32. The regulator channel 62 is also connected to the regulator pipe 38 that communicates with the regulator 33.

A master cut valve 64 is provided in a midway position in the master channel 61. The master cut valve 64 is provided on a brake fluid supply route extending from the master cylinder 32 to each wheel cylinder 23. The master cut valve 64 is provided with an ON/OFF controlled solenoid and a spring, and is constituted by a normally open switch valve that is secured in a closed state by an electromagnetic force generated by the solenoid upon reception of a prescribed control current supply and opened when the solenoid is not electrified. When open, the master cut valve 64 allows the brake fluid to flow bidirectionally between the master cylinder 32 and the first channel 45a of the main channel 45. When the solenoid is electrified by the prescribed control current such that the master cut valve 64 closes, the flow of brake fluid through the master channel 61 is interrupted. In this embodiment, the master cut valve 64 also functions as a pressure reduction unit.

A stroke simulator 69 is connected to the master channel 61 on an upstream side of the master cut valve 64 via a simulator cut valve 68 serving as a switch valve. The simulator cut valve 68 is provided in a channel that connects the master cylinder 32 to the stroke simulator 69. The simulator cut valve 68 is provided with an ON/OFF controlled solenoid and a spring, and is constituted by a normally closed switch valve that is secured in an open state by an electromagnetic force generated by the solenoid upon reception of a prescribed control current supply and closed when the solenoid is not electrified. When the simulator cut valve 68 is in a closed state, a flow of brake fluid between the master channel 61 and the stroke simulator 69 is interrupted. When the solenoid is electrified such that the simulator cut valve 68 opens, the brake fluid is allowed to flow bidirectionally between the master cylinder 32 and the stroke simulator 69.

In this embodiment, control is performed to maintain the driven state of the simulator cut valve 68 by steadily applying a lower steady-state current than an activation current thereto following application of the activation current, with a view to improving controllability and reducing power consumption. Further, to prevent destabilization of the operational state of the simulator cut valve 68 due to momentary decreases of the voltage of the drive power source and so on during supply of the steady-state current, a control securing current which is higher than the steady-state current is supplied to the simulator cut valve 68 every time the brake pedal 24 is depressed. In so doing, the responsiveness of the stroke simulator 69 is secured. The specific content of this control of the simulator cut valve 68 will be described in detail below.

The stroke simulator 69 includes a plurality of pistons and springs, and generates a reaction force corresponding to the depression force applied to the brake pedal 24 by the driver when the simulator cut valve 68 opens. The stroke simulator 69 is preferably provided with a multi-stage spring characteristic in order to improve the feeling imparted to the driver during a braking operation.

A regulator cut valve 65 is provided in a midway position of the regulator channel 62. The regulator cut valve 65 is provided on a brake fluid supply route extending from the regulator 33 to each wheel cylinder 23. The regulator cut valve 65 is also provided with an ON/OFF controlled solenoid and a spring, and is constituted by a normally open switch valve that is secured in a closed state by an electromagnetic force generated by the solenoid upon reception of a prescribed control current supply and opened when the solenoid is not electrified. When open, the simulator cut valve 65 allows the brake fluid to flow bidirectionally between the regulator 33 and the second channel 45b of the main channel 45. When the solenoid is electrified such that the regulator cut valve 65 closes, the flow of brake fluid through the regulator channel 62 is interrupted.

An accumulator channel 63 is formed in the hydraulic actuator 40 in addition to the master channel 61 and the regulator channel 62. One end of the accumulator channel 63 is connected to the second channel 45b of the main channel 45, while the other end is connected to the accumulator pipe 39 that communicates with the accumulator 35.

A pressure-increasing linear control valve 66 is provided in a midway position of the accumulator channel 63. Further, the accumulator channel 63 and the second channel 45b of the main channel 45 are connected to the reservoir channel 55 via a pressure-reducing linear control valve 67. The pressure-increasing linear control valve 66 and the pressure-reducing linear control valve 67 are respectively provided with a linear solenoid and a spring, and are respectively constituted by normally closed electromagnetic control valves that are closed when the solenoid is not electrified. The respective openings of the pressure-increasing linear control valve 66 and the pressure-reducing linear control valve 67 are adjusted in proportion to the current that is supplied to their respective solenoids.

The pressure-increasing linear control valve 66 is provided as a shared pressure-increasing control valve for the plurality of wheel cylinders 23 corresponding to the wheels. Similarly, the pressure-reducing linear control valve 67 is provided as a shared pressure-reducing control valve for the plurality of wheel cylinders 23. In other words, the pressure-increasing linear control valve 66 and pressure-reducing linear control valve 67 of this embodiment are provided as a pair of shared control valves for controlling the supply and discharge of the working fluid delivered by the power hydraulic pressure source 30 to and from the respective wheel cylinders 23. Sharing the pressure-increasing linear control valve 66 and so on among the wheel cylinders 23 in this manner is preferable in terms of cost compared to a case in which a linear control valve is provided for each wheel cylinder 23.

Note that here, a differential pressure between the outlet and inlet of the pressure-increasing linear control valve 66 corresponds to a differential pressure between the pressure of the brake fluid in the accumulator 35 and the pressure of the brake fluid in the main channel 45, whereas a differential pressure between the outlet and inlet of the pressure-reducing linear control valve 67 corresponds to a differential pressure between the pressure of the brake fluid in the main channel 45 and the pressure of the brake fluid in the reservoir 34. Further, assuming that an electromagnetic driving force corresponding to the power supplied to the linear solenoids of the pressure-increasing linear control valve 66 and pressure-reducing linear control valve 67 is set at F1, a biasing force of the spring is set at F2, and a differential pressure acting force corresponding to the differential pressure between the respective outlets and inlets of the pressure-increasing linear control valve 66 and pressure-reducing linear control valve 67 is set at F3, a relationship of F1+F3=F2 is established. Hence, by continuously controlling the power supplied to the linear solenoids of the pressure-increasing linear control valve 66 and pressure-reducing linear control valve 67, the differential pressure between the respective outlets and inlets of the pressure-increasing linear control valve 66 and pressure-reducing linear control valve 67 can be controlled.

In the brake apparatus 20, the power hydraulic pressure source 30 and the hydraulic actuator 40 are controlled by a brake ECU 70 serving as a control unit of this embodiment. The brake ECU 70 is constituted by a microprocessor having a Central Processing Unit (CPU), and in addition to the Central Processing Unit (CPU), includes Read Only Memory (ROM) storing various programs, Random Access Memory (RAM) for storing data temporarily, input/output ports, a communication port, and so on. The brake ECU 70 is capable of communicating with a higher order hybrid ECU (not shown) so as to control the pump 36 of the power hydraulic pressure source 30 and the electromagnetic control valves 51 to 54, 56 to 59, 60, and 64 to 68 constituting the hydraulic actuator 40 on the basis of control signals from the hybrid ECU and signals from various sensors.

Further, the brake ECU 70 is connected to a regulator pressure sensor 71, an accumulator pressure sensor 72, and a control pressure sensor 73. The regulator pressure sensor 71 detects the pressure of the brake fluid in the regulator channel 62 on the upstream side of the regulator cut valve 65, or in other words the regulator pressure, and transmits a signal indicating the detected value to the brake ECU 70. The accumulator pressure sensor 72 detects the pressure of the brake fluid in the accumulator channel 63 on the upstream side of the pressure-increasing linear control valve 66, or in other words an accumulator pressure, and transmits a signal indicating the detected value to the brake ECU 70. The control pressure sensor 73 detects the pressure of the brake fluid in the first channel 45a of the main channel 45 and transmits a signal indicating the detected value to the brake ECU 70. The detection values of the respective pressure sensors 71 to 73 are transmitted in sequence to the brake ECU 70 at predetermined time intervals, and are stored and held in a predetermined storage area of the brake ECU 70 in predetermined amounts.

When the isolation valve 60 is opened such that the first channel 45a and second channel 45b of the main channel 45 communicate with each other, an output value of the control pressure sensor 73 indicates both a hydraulic pressure on a low pressure side of the pressure-increasing linear control valve 66 and a hydraulic pressure on a high pressure side of the pressure-reducing linear control valve 67, and therefore this output value may be used to control both the pressure-increasing linear control valve 66 and the pressure-reducing linear control valve 67. Further, when the pressure-increasing linear control valve 66 and the pressure-reducing linear control valve 67 are closed and the master cut valve 64 is open, the output value of the control pressure sensor 73 indicates the master cylinder pressure. Moreover, when the isolation valve 60 is open such that communication is established between the first channel 45a and second channel 45b of the main channel 45, the ABS holding valves 51 to 54 are open, and the ABS pressure reduction valves 56 to 59 are closed, the output value of the control pressure sensor 73 indicates the working fluid pressure acting on the respective wheel cylinders 23, or in other words a wheel cylinder pressure.

A stroke sensor 25 provided on the brake pedal 24 is also included in the sensors connected to the brake ECU 70. The stroke sensor 25 detects a pedal stroke as an operation amount of the brake pedal 24, and transmits a signal indicating the detected value to the brake ECU 70. Output values of the stroke sensor 25 are also transmitted in sequence to the brake ECU 70 at predetermined time intervals so as to be stored and held in a predetermined storage area of the brake ECU 70 in predetermined amounts. Note that brake operation state detecting means other than the stroke sensor 25 may be provided in addition to or in place of the stroke sensor 25 and connected to the brake ECU 70. Examples of the brake operation state detecting means include a pedal depression force sensor that detects an operation force applied to the brake pedal 24, and a brake switch that detects depression of the brake pedal 24.

The brake apparatus 20 constituted as described above is capable of executing brake regeneration cooperative control. The brake apparatus 20 begins braking upon reception of a braking request. The braking request is generated when braking force is to be applied to the vehicle, for example when the driver operates the brake pedal 24 and so on. Having received the braking request, the brake ECU 70 calculates the required braking force, and then subtracts a braking force derived from regeneration from the required braking force to calculate a required hydraulic braking force, i.e. the braking force to be generated by the brake apparatus 20. The brake ECU 70 then calculates target hydraulic pressures of the respective wheel cylinders 23FR to 23RL on the basis of the calculated required hydraulic braking force. The brake ECU 70 then uses feedback control to determine values of the control current to be supplied to the pressure-increasing linear control valve 66 and pressure-reducing linear control valve 67 such that the wheel cylinder pressure matches the target hydraulic pressure.

Thus, in the brake apparatus 20, the brake fluid is supplied to the wheel cylinders 23 from the power hydraulic pressure source 30 via the pressure-increasing linear control valve 66 such that a braking force is applied to the wheels. The brake fluid is discharged from the wheel cylinders 23 via the pressure-reducing linear control valve 67 as required in order to adjust the braking force applied to the wheels. In this embodiment, a wheel cylinder pressure control system is constituted by the power hydraulic pressure source 30, the pressure-increasing linear control valve 66, the pressure-reducing linear control valve 67, and so on. The wheel cylinder pressure control system performs braking force control using a so-called brake-by-wire method. The wheel cylinder pressure control system is provided in parallel with a brake fluid supply route extending from the master cylinder unit 27 to the wheel cylinder 23.

At this time, the brake ECU 70 closes the regulator cut valve 65 and master cut valve 64 to ensure that the brake fluid delivered by the regulator 33 and master cylinder 32 is not supplied to the wheel cylinder 23. During brake regeneration cooperative control, a front-rear differential pressure corresponding to the magnitude of the regenerative braking force acts between the upstream and downstream sides of the regulator cut valve 65 and master cut valve 64.

Needless to say, the brake apparatus 20 according to this embodiment is also capable of controlling the braking force using the wheel cylinder pressure control system when no regenerative braking force is used and the required braking force is derived from hydraulic braking force alone. Hereafter, a control mode in which the braking force is controlled by the wheel cylinder pressure control system regardless of whether or not brake regeneration cooperative control is executed will be referred to as a "linear control mode" where appropriate. This control will also be referred to occasionally as brake-by-wire control.

When the required braking force is generated by hydraulic braking force alone in the linear control mode, the brake ECU 70 controls the regulator pressure or the master cylinder pressure as a target pressure of the wheel cylinder pressure. Hence, in this case, the brake fluid does not necessarily have to be supplied to the wheel cylinder 23 by the wheel cylinder pressure control system. This is because the required braking force can be generated naturally by introducing the master cylinder pressure or regulator pressure, which are increased in accordance with an operation of the brake pedal by the driver, to the wheel cylinders as is.

Therefore, when no regenerative braking force is used, for example when the vehicle is stationary, the brake apparatus 20 may supply brake fluid to the respective wheel cylinders 23 from the regulator 33. A control mode in which brake fluid is supplied to the respective wheel cylinders 23 from the regulator 33 will be referred to hereafter as a regulator mode. In other words, when the vehicle is stationary, the brake ECU 70 may switch from the linear control mode to the regulator mode to generate the braking force. By switching the control mode when the vehicle comes to a halt, the control mode can be switched through comparatively simple control. Alternatively, it may be more practical to have the brake ECU 70 switch the control mode from the linear control mode to the regulator mode when the vehicle speed has been sufficiently reduced by braking such that regenerative braking is halted.

In the regulator mode, the brake ECU 70 opens the regulator cut valve 65 and isolation valve 60, and closes the master cut valve 64. Thus, control of the pressure-increasing linear control valve 66 and pressure-reducing linear control valve 67 is stopped such that these valves 66 and 67 close. As a result, brake fluid is supplied to the respective wheel cylinders 23 from the regulator 33 such that braking force is applied to the respective wheels in accordance with the regulator pressure. The power hydraulic pressure source 30 is connected to the regulator 33 as the high pressure side, and therefore the accumulated pressure in the power hydraulic pressure source 30 can be used favorably to generate the braking force.

Hence, in the regulator mode, the brake ECU 70 stops supplying a control current to the pressure-increasing linear control valve 66 and pressure-reducing linear control valve 67 such that the two linear control valves close and enter a resting state. Thus, the operation frequency of the pressure-increasing linear control valve 66 and pressure-reducing linear control valve 67 can be reduced, and as a result, the pressure-increasing linear control valve 66 and pressure-reducing linear control valve 67 can be used over a long time period. In other words, the life of the pressure-increasing linear control valve 66 and pressure-reducing linear control valve 67 can be extended.

During control in the linear control mode, the wheel cylinder pressure may diverge from the target hydraulic pressure due to an abnormality such as working fluid leakage from various locations, for example. On the basis of a measurement value of the control pressure sensor 73, for example, the brake ECU 70 periodically determines whether or not a response abnormality has occurred in the wheel cylinder pressure. The brake ECU 70 determines that an abnormality has occurred in the control response of the wheel cylinder pressure when the wheel cylinder pressure measurement value diverges from the target hydraulic pressure by more than a reference amount, for example. Having determined that an abnormality has occurred in the control response of the wheel cylinder pressure, the brake ECU 70 halts the linear control mode and switches the control mode to a manual brake mode. The brake ECU 70 also switches the control mode to the manual brake mode when an abnormality is detected in the regulator mode. In the manual brake mode, driver input into the brake pedal 24 is converted into hydraulic pressure and transmitted to the wheel cylinder 23 mechanically such that braking force is applied to the wheels. The manual brake mode serves as a backup control mode in consideration of the need for a fail-safe.

A hydro booster mode is an example of a backup control mode. A hydro booster mode is a control mode for securing a working fluid flow route from the master cylinder 32 to the wheel cylinder 23 such that braking force is generated mechanically in accordance with operation input into the brake operating member. In the hydro booster mode, the brake ECU 70 stops supplying control currents to all of the electromagnetic control valves. Accordingly, the normally open master cut valve 64 and regulator cut valve 65 are opened, while the normally closed isolation valve 60 and simulator cut valve 68 are closed. Control of the pressure-increasing linear control valve 66 and pressure-reducing linear control valve 67 is halted such that these two valves are closed.

As a result, the brake fluid supply route is divided into two systems, namely a master cylinder side and a regulator side. The master cylinder pressure is transmitted to the wheel cylinders 23FR and 23FL of the front wheels, while the regulator pressure is transmitted to the wheel cylinders 23RR and 23RL of the rear wheels. The delivery destination of the working fluid from the master cylinder 32 is switched from the stroke simulator 69 to the wheel cylinders 23FR and 23FL of the front wheels. Further, the hydraulic booster 31 is a mechanism for amplifying the pedal depression force mechanically, and therefore continues to function even when the control mode shifts to the hydro booster mode such that control currents are not supplied to any of the electromagnetic control valves. According to the hydro booster mode, braking force can be generated using the hydraulic booster even when electrification of the electromagnetic control valves is halted due to an abnormality in the control system, and therefore the hydro booster mode has a superior fail-safe characteristic.

Figure 2:
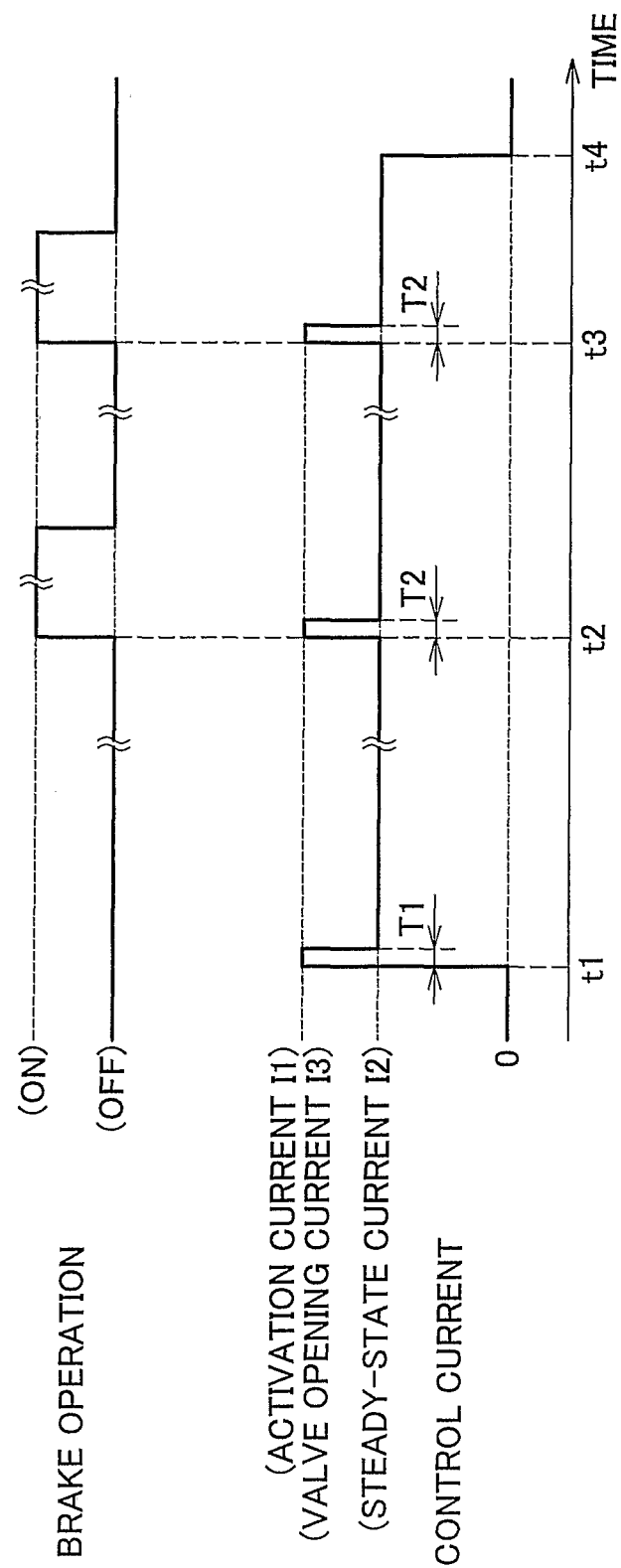
FIG. 2 is a timing chart illustrating a control method for a simulator cut valve of the brake apparatus according to the first embodiment.

Next, a method of controlling the simulator cut valve 68 serving as a switch valve will be described. FIG. 2 is a timing chart illustrating a method of controlling the simulator cut valve. The upper section of the drawing represents the operation state of the brake pedal 24, while the lower section represents the control current supplied to the simulator cut valve 68. The abscissa of the drawing represents the passage of time.

In the example shown in the drawing, the vehicle is driven at a time t1, and simultaneously, an activation current I1 is supplied to the simulator cut valve 68. The activation current I1 is set in advance through experiment or the like at a current value enabling the simulator cut valve 68 to be opened reliably from a closed state. Here, the activation current I1 is supplied over a predetermined electrification period T1. The electrification period T1 is preset in relation to the activation current I1 at a time period in which the simulator cut valve 68 can be opened reliably.

When the electrification period T1 elapses, the control current is switched to a steady-state current I2 that is lower than the activation current. The steady-state current I2 is set in advance at a current value enabling the simulator cut valve 68 opened by the activation current I1 to be maintained in an open state. As described above, due to hysteresis in the opening characteristic, the current required to open the simulator cut valve 68 from a closed state is larger than the current required to maintain the open state. In other words, the current required to maintain the open state may be set smaller than the opening start current. Hence, a lower current value than the activation current I1 is set as the steady-state current I2, and this current is applied continuously to the simulator cut valve 68.

However, the steady-state current I2 is set at the minimum required value for maintaining the open state, and therefore, when the electrical load of the vehicle increases during vehicle control, leading to a temporary voltage reduction, the current value may decrease such that the simulator cut valve 68 closes. Once the simulator cut valve 68 has closed, it cannot be opened again simply by continuing to apply the same steady-state current I2. Hence, in this embodiment, a valve opening current I3 that is higher than the steady-state current I2 is supplied to the simulator cut valve 68 at least while braking control is underway such that the simulator cut valve 68 can be opened reliably.

More specifically, the valve opening current I3 is supplied at substantially the same time as the brake pedal 24 is depressed by the driver at times t2 and t3, respectively. At this time, the valve opening current I3 is supplied over a predetermined electrification period T2. The valve opening current I3 and the electrification period T2 may be set in advance through experiment or the like at a current value and an electrification period that allow the simulator cut valve 68 to be opened reliably from a closed state even if the valve is closed during application of the steady-state current I2. For convenience, in this embodiment the valve opening current I3 and the electrification period T2 are matched to the activation current I1 and the electrification period T1, respectively. In a modified example, the valve opening current I3 may be set at a current value that is higher than the steady-state current I2 and lower than the activation current I1. Further, the electrification period T2 may be set shorter than the electrification period T1.

In the example in the drawing, driving of the vehicle is halted at a time t4, and at the same time, electrification of the simulator cut valve 68 is halted. As a result, the simulator cut valve 68 shifts to a closed state.

Figure 3:
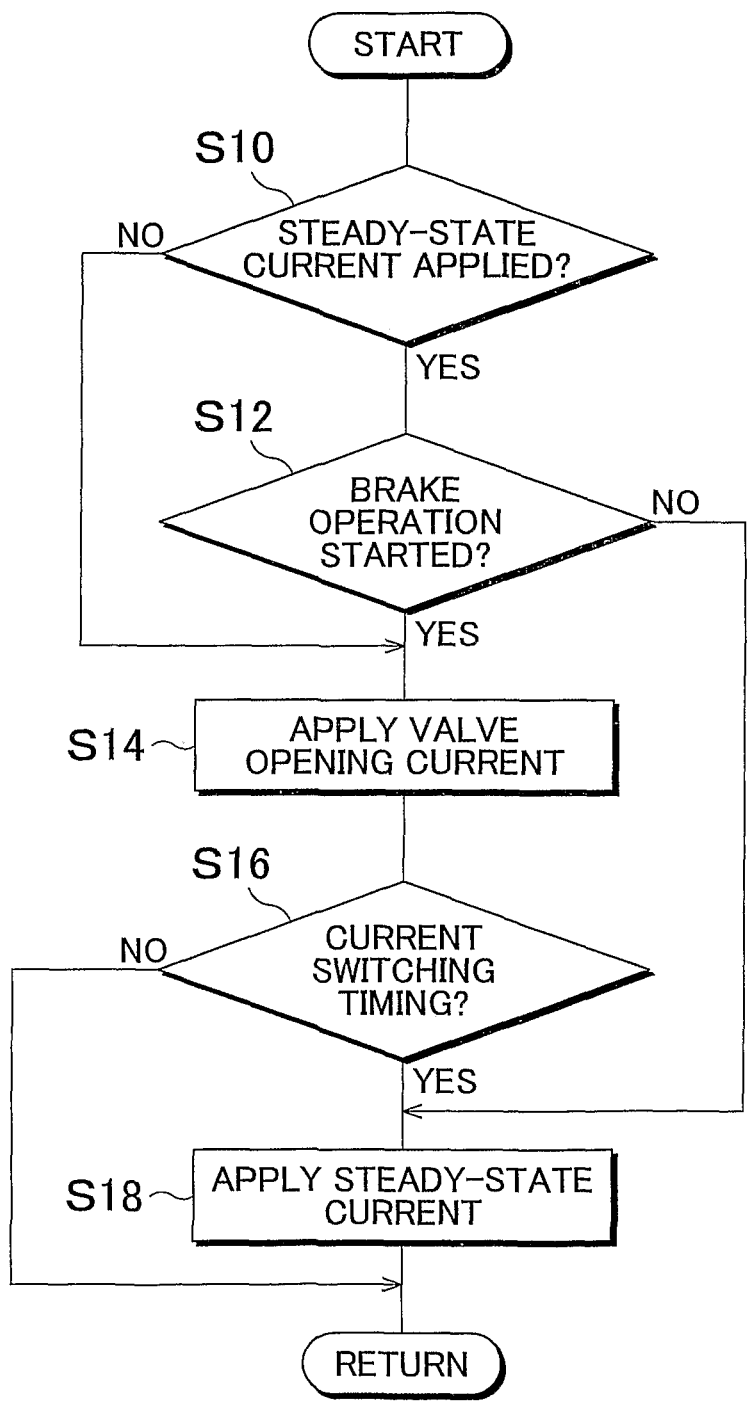
FIG. 3 is a flowchart illustrating a processing flow executed on the simulator cut valve of the brake apparatus according to the first embodiment.

FIG. 3 is a flowchart illustrating the flow of processing executed on the simulator cut valve. This processing is executed repeatedly after an ignition switch, not shown in the drawings, is switched ON.

First, the brake ECU 70 determines whether or not the steady-state current I2 is already being applied to the simulator cut valve 68 (S10). When driving of the vehicle has begun but the steady-state current I2 is not yet being applied (N in S10), the activation current I1 (which is equal to the valve opening current I3 in this embodiment) is applied (S14). Then, when it is determined that the electrification period T1 has elapsed and a current switching timing has arrived (Y in S16), the current is switched to the steady-state current I2 (S18). The determination as to whether or not the current switching timing has arrived may be performed through interruption processing using a timer not shown in the drawings, for example. When the current switching timing has not arrived in S16 (N in S16), the processing is temporarily terminated.

On the other hand, when the steady-state current is already being applied (Y in S10), the brake ECU 70 determines on the basis of the output signal of the stroke sensor 25 whether or not a brake operation in which the brake pedal 24 is depressed has begun (S12). When the brake operation has begun (Y in S12), the valve opening current I3 is applied (S14). Then, when it is determined that the electrification period T2 has elapsed and the current switching timing has arrived (Y in S16), the current is switched back to the steady-state current I2 (S18). When the brake operation has not begun in S12 (N in S12), the steady-state current I2 continues to be applied. The determination as to whether or not the electrification period T2 has elapsed may also be performed through interruption processing using a timer not shown in the drawings, for example.

As described above, in this embodiment, the activation current I1 for opening the simulator cut valve 68 from a closed state is applied, whereupon the steady-state current I2 for maintaining the open state is applied continuously. By applying the steady-state current I2 continuously in this manner, control responsiveness corresponding to depression of the brake pedal 24 can be maintained at a favorable level. Meanwhile, by setting the steady-state current I2 lower than the activation current I1, superfluous current flow can be suppressed, enabling a reduction in power consumption. In particular, the valve opening current I3, which is higher than the steady-state current I2, is applied to the simulator cut valve 68 every time the brake pedal 24 is depressed. Therefore, the simulator cut valve 68 can be maintained in an open state even when the voltage of the drive power source momentarily decreases due to an increase in the electrical load of the vehicle during supply of the steady-state current I2, and as a result, control responsiveness can be secured. After applying the valve opening current I3, the current is switched back to the steady-state current I2. As a result, the reduction in power consumption can be secured.

Note that in this embodiment, electrification control of the simulator cut valve 68 was described in detail, but similar control processing is preferably performed on the isolation valve 60, which is also a normally closed electromagnetic valve, in conjunction with control of the simulator cut valve 68.

Next, a second embodiment of the present invention will be described. This embodiment is substantially identical to the first embodiment, and differs therefrom only in the electrification control method of the switch valve. Accordingly, substantially identical constitutional parts to the first embodiment have been allocated identical reference symbols where necessary, and description thereof has been omitted as appropriate.

Figure 4:
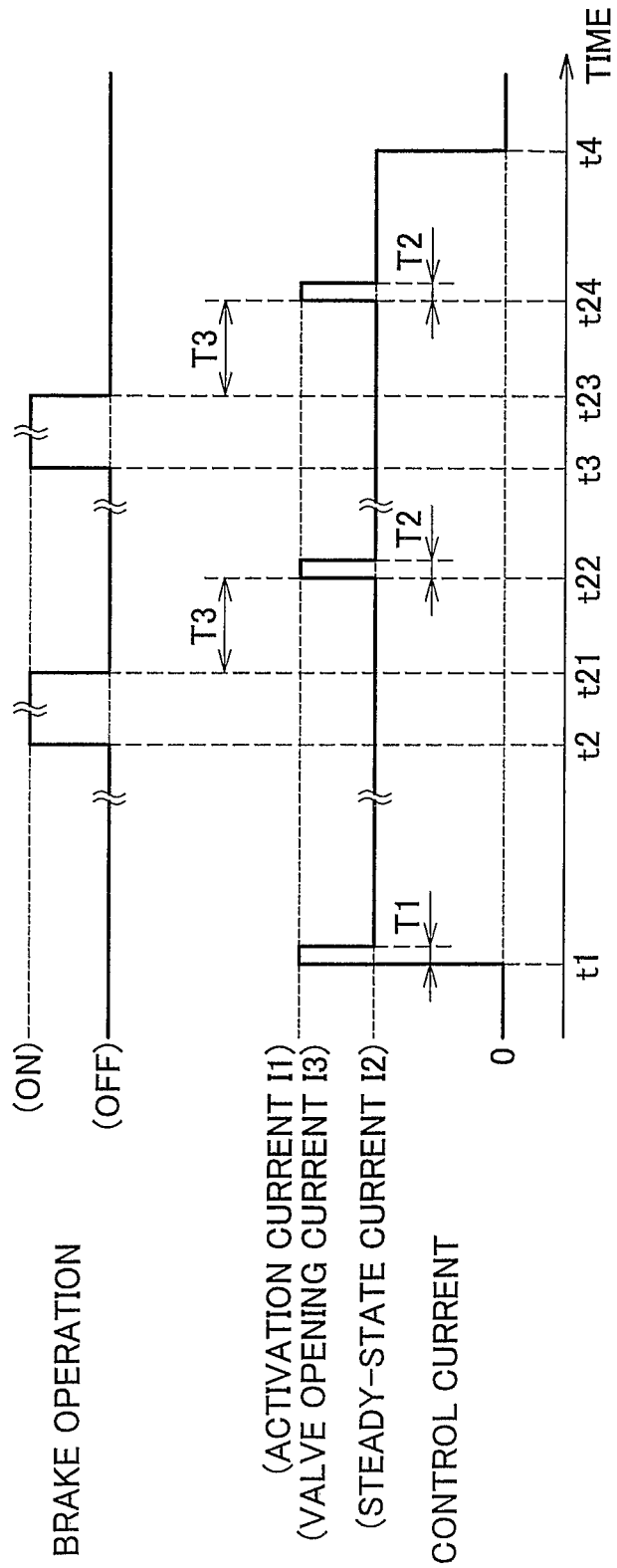
FIG. 4 is a timing chart illustrating a control method for a simulator cut valve of a brake apparatus according to a second embodiment.

FIG. 4 is a timing chart illustrating a method of controlling the simulator cut valve. The upper section of the drawing represents the operation state of the brake pedal 24, while the lower section represents the control current supplied to the simulator cut valve 68. The abscissa of the drawing represents the passage of time.

In the first embodiment described above, an example in which the valve opening current I3 is applied every time the brake pedal 24 is depressed was described. Strictly speaking, however, a temporal delay occurs in the control current as it rises to the target value, and therefore a command to supply the valve opening current I3 is preferably issued immediately before the brake pedal 24 is depressed such that the valve opening current I3 is applied at the time of the actual depression. On the other hand, depression of the brake pedal 24 depends on the will of the driver, and comprehending the will of the driver on the brake ECU 70 side is difficult. Hence, in this embodiment, a command to supply the valve opening current I3 is output at a preset timing during the application period of the steady-state current I2. In so doing, the valve opening current I3 is more likely to be supplied when the brake pedal 24 is depressed.

More specifically, in the example shown in the drawing, the brake pedal 24 is depressed by the driver at times t2 and t3 and the depression is released at times t21 and t23, respectively. Here, application of the valve opening current I3 is instructed following the elapse of a preset setting period T3, which starts from the point at which the depression is released, with the aim of ensuring that the oil passage is switched reliably at the time of the subsequent brake operation. As shown in the drawing, the valve opening current I3 is supplied for an electrification period T2 that starts from times t22 and t24 at the end of the setting period T3 following termination of a brake operation by the driver.

Figure 5:
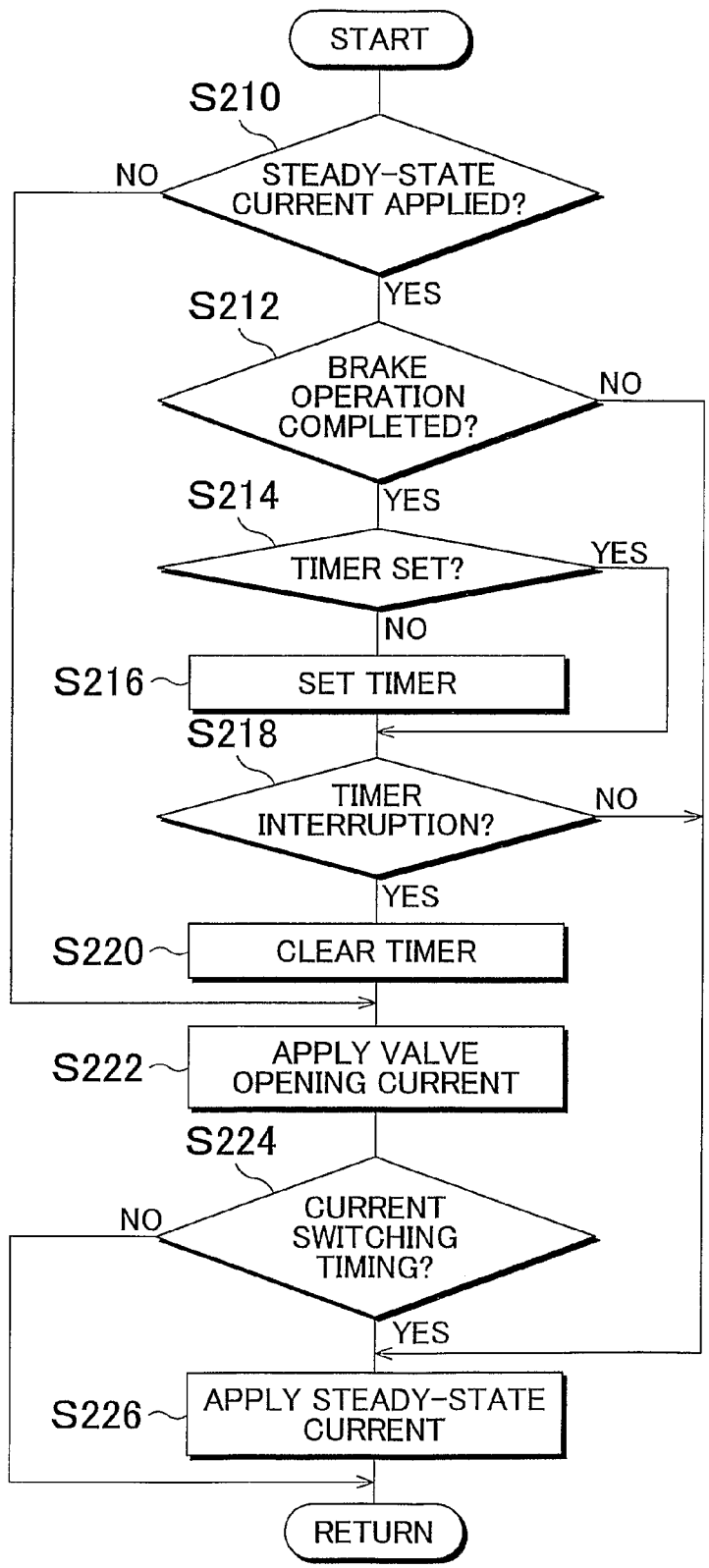
FIG. 5 is a flowchart illustrating a processing flow executed on the simulator cut valve of the brake apparatus according to the second embodiment.

FIG. 5 is a flowchart illustrating the flow of processing executed on the simulator cut valve. This processing is executed repeatedly after the ignition switch, not shown in the drawings, is switched ON.

When the steady-state current I2 is already being applied to the simulator cut valve 68 (Y in S210), the brake ECU 70 determines whether or not a brake operation end point has been reached by releasing depression of the brake pedal 24 (S212). When the brake operation end point has been reached (Y in S212), and a timer, not shown in the drawing, has not yet been set (N in S214), the brake ECU 70 sets the timer (S216). When the aforementioned setting period T3 has elapsed, the timer inputs an interruption signal indicating this into the Central Processing Unit (CPU) of the brake ECU 70. If the timer has already been set (Y in S214), the processing of S216 is skipped.

When a timer interruption has been performed (Y in S218), the brake ECU 70 clears the timer and then applies the valve opening current I3 (S220, S222). When the brake operation end point has not been reached in S212 (N in S212), or when an interruption has not been performed in S218 (N in S218), the brake ECU 70 continues to apply the steady-state current I2 (S226).

Note that the processing of S210, S222, S224 and 5226 is identical to the processing of S10, S14, S16 and S18 in FIG. 3, respectively, and therefore detailed description thereof has been omitted.

According to this embodiment, the valve opening current I3 is applied at a predetermined timing even when the brake pedal 24 has not been depressed. As a result, the likelihood that the stroke simulator 69 will function effectively during a subsequent brake operation increases. Note that this embodiment is effective when implemented in combination with the first embodiment. In other words, the valve opening current I3 is preferably applied in the manner shown in FIG. 2 at the beginning of the brake operations in FIG. 4. In so doing, the responsiveness of the simulator cut valve 68 can be secured even more reliably when the voltage decreases during a brake operation.

Next, a third embodiment of the present invention will be described. This embodiment is substantially identical to the first embodiment and differs therefrom only in the electrification control method of the switch valve. Accordingly, substantially identical constitutional parts to the first embodiment have been allocated identical reference symbols where necessary, and description thereof has been omitted as appropriate.

In this embodiment, the valve opening current I3 is applied when an operation of an accelerator, not shown in the drawings, is terminated rather than in accordance with the brake pedal 24. More specifically, an accelerator pedal is depressed during vehicle travel, excluding creep travel, and when this depression is released for the purpose of deceleration, it is highly likely that the brake pedal 24 will be depressed subsequently. Here, in consideration of this point, the valve opening current I3 is applied when a release operation of the accelerator pedal, not shown in the drawings, is detected.

Figure 6:
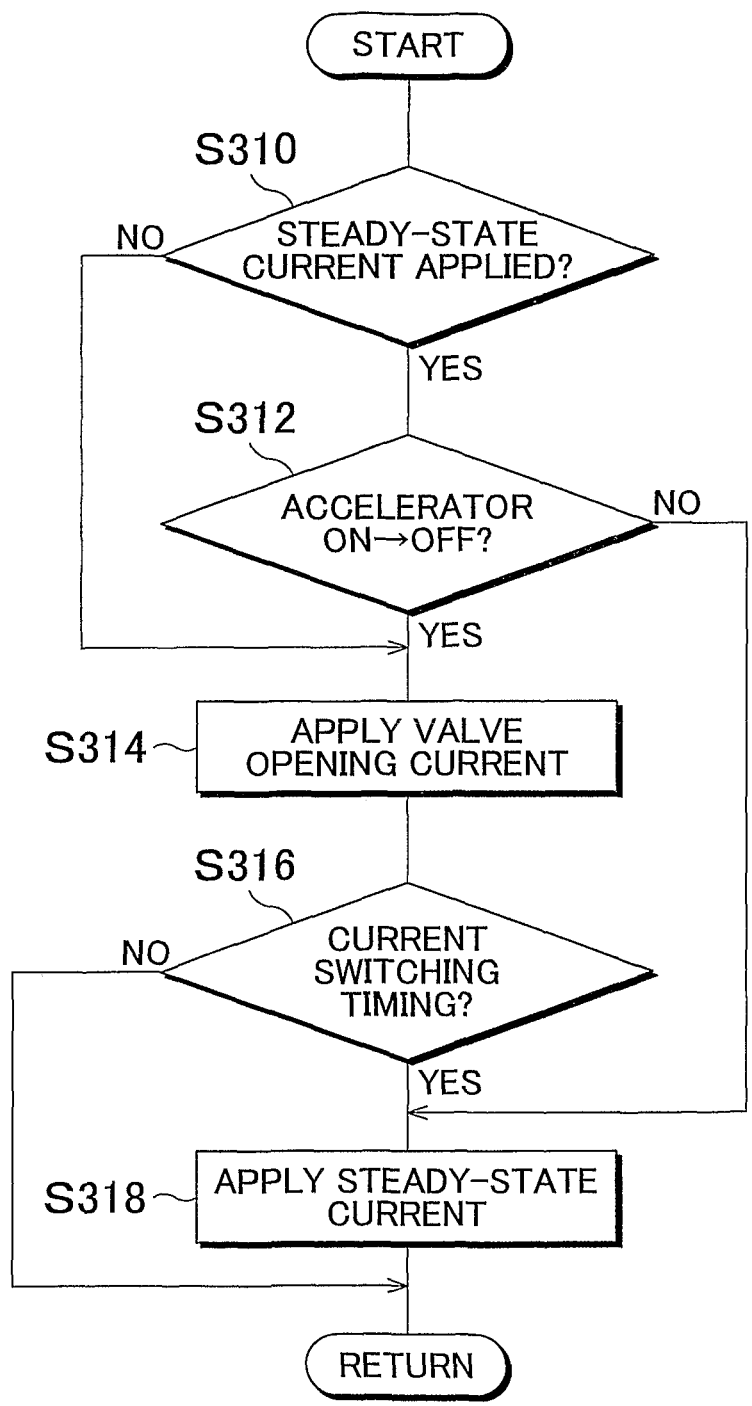
FIG. 6 is a flowchart illustrating a processing flow executed on a simulator cut valve of a brake apparatus according to a third embodiment.

FIG. 6 is a flowchart illustrating the flow of processing executed on the simulator cut valve. This processing is executed repeatedly after the ignition switch, not shown in the drawings, is switched ON.

When the steady-state current I2 is already being applied to the simulator cut valve 68 (Y in S310), the brake ECU 70 determines whether or not an accelerator operation has shifted from ON to OFF due to the release of accelerator pedal depression (S312). This determination is made on the basis of detection information from an accelerator opening sensor, not shown in the drawings, for detecting the operation state of the accelerator pedal.

Having determined that the accelerator pedal is OFF (Y in S312), the brake ECU 70 applies the valve opening current I3 (S314). When an accelerator pedal release operation is not detected (N in S312), the brake ECU 70 continues to apply the steady-state current I2 (S318).

Note that the processing of S310, 5314, 5316 and S318 is identical to the processing of S10, S14, S16 and S18 in FIG. 3, respectively, and therefore detailed description thereof has been omitted.

According to this embodiment, a command to apply the valve opening current I3 is issued in anticipation of depression of the brake pedal 24 when an accelerator pedal release operation is performed. As a result, supply of the valve opening current I3 is begun at a timing preceding actual depression of the brake pedal 24. Hence, even when a temporal delay occurs in the rise of the valve opening current I3, delays in relation to the brake operation can be prevented or suppressed. As a result, the responsiveness of the simulator cut valve 68 can be secured even more reliably.

Next, a fourth embodiment of the present invention will be described. This embodiment is substantially identical to the first embodiment and differs therefrom only in the electrification control method of the switch valve. Accordingly, substantially identical constitutional parts to the first embodiment have been allocated identical reference symbols where necessary, and description thereof has been omitted as appropriate.

In this embodiment, the valve opening current I3 is supplied regardless of the will of the driver by anticipating a brake operation during specific vehicle travel control executed automatically on the vehicle side. Here, Vehicle Stability Control (VSC) for suppressing side slipping of the wheels when the vehicle turns is employed as an example of the specific vehicle travel control. Vehicle Stability Control (VSC) is executed automatically on the vehicle side, and therefore the isolation valve 60, rather than the simulator cut valve 68, serves here as the main subject switch valve. More specifically, during this type of vehicle travel control, the hydraulic pressure supply from the power hydraulic pressure source 30 to the respective wheels must be kept stable at all times. Therefore, by applying the activation current I1 and then continuously applying the steady-state current I2 to the normally closed isolation valve 60, the open state thereof is maintained.

Figure 7:
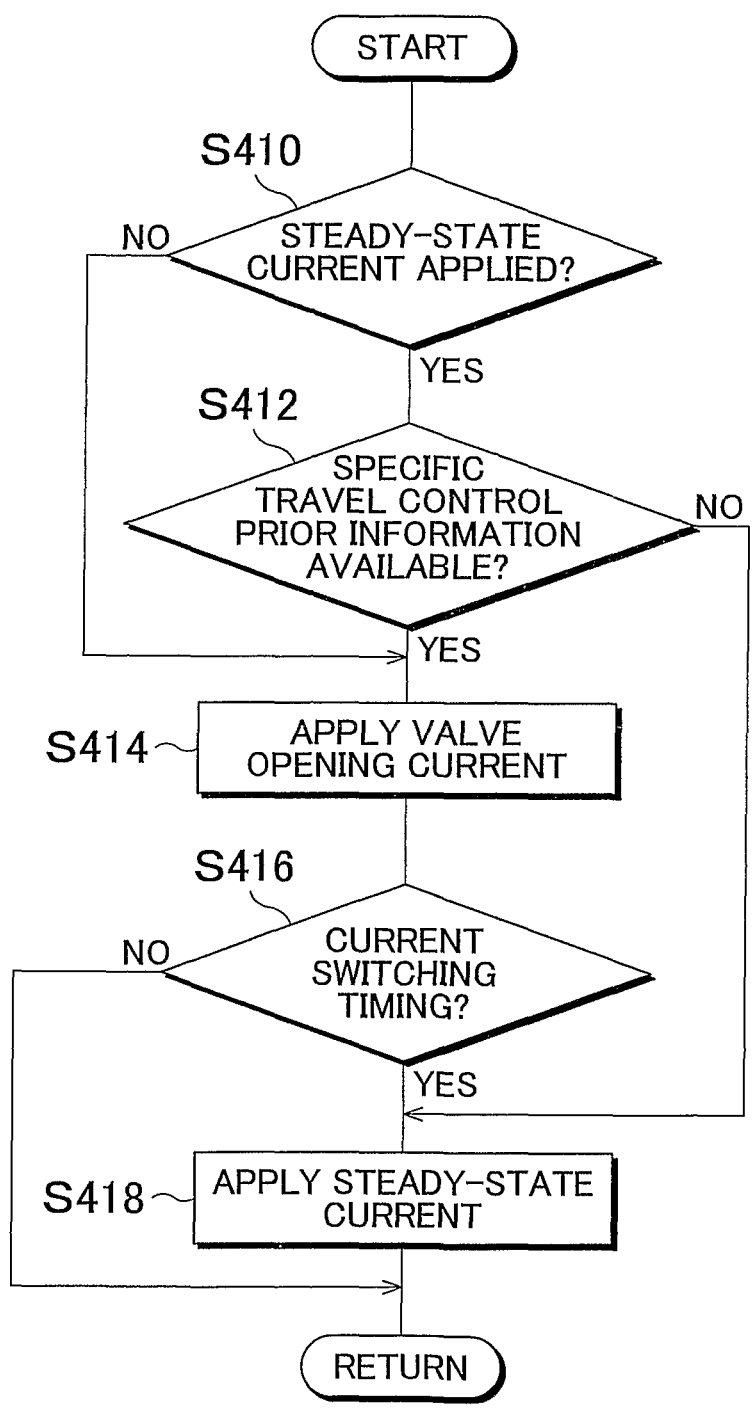
FIG. 7 is a flowchart illustrating a processing flow executed on an isolation valve of a brake apparatus according to a fourth embodiment.

FIG. 7 is a flowchart illustrating the flow of processing executed on the isolation valve. This processing is executed repeatedly after the ignition switch, not shown in the drawings, is switched ON.

When the steady-state current I2 is already being applied to the isolation valve 60 (Y in S410), the brake ECU 70 determines whether or not prior information relating to a vehicle stability control (VSC) operation (to be referred to hereafter as "VSC operation prior information") has been obtained (S412). Here, Vehicle Stability Control (VSC) is used to detect a yaw rate of the vehicle and control the braking force applied to each wheel such that the yaw rate approaches a target yaw rate at which side slipping can be suppressed. However, since this control is widely available, detailed description thereof has been omitted. A Vehicle Stability Control (VSC) operation is begun when a Vehicle Stability Control (VSC) operation condition, which is set in advance on the basis of information from an acceleration sensor, a wheel speed sensor, and so on, not shown in the drawings, is established. Here, information indicating that the Vehicle Stability Control (VSC) operation condition is not yet fully established, but that establishment of the Vehicle Stability Control (VSC) operation condition is anticipated, serves as the Vehicle Stability Control (VSC) operation prior information. The brake ECU 70 determines that a condition for anticipating a shift to Vehicle Stability Control (VSC) has been established every time it receives the Vehicle Stability Control (VSC) operation prior information from a VSC ECU, not shown the drawings, for controlling the Vehicle Stability Control (VSC), and applies the valve opening current I3 to the isolation valve 60 before the shift to Vehicle Stability Control (VSC) actually takes place. Here, for convenience, the valve opening current I3 may be matched to the activation current I1.

Hence, after obtaining the Vehicle Stability Control (VSC) operation prior information (Y in S412), the brake ECU 70 applies the valve opening current I3 (S414). When the Vehicle Stability Control (VSC) operation prior information has not been obtained (N in S412), the brake ECU 70 continues to apply the steady-state current I2 (S418).

Note that the processing of S410, S414, S416 and S418 is identical to the processing of S10, S14, S16 and S18 in FIG. 3, respectively, and therefore detailed description thereof has been omitted.

According to this embodiment, supply of the valve opening current I3 is begun when a Vehicle Stability Control (VSC) operation is anticipated, i.e. at a prior timing to the actual Vehicle Stability Control (VSC) operation. As a result, the responsiveness of the isolation valve 60 during braking control within Vehicle Stability Control (VSC) can be secured even more reliably.

Note that in this embodiment, Vehicle Stability Control (VSC) is cited as an example of the specific vehicle travel control, but other types of vehicle travel control performed in tandem with braking control, such as Traction Control (TRC) for suppressing spinning of the drive wheels during advancement and acceleration of the vehicle and inter-vehicle control for running the vehicle while maintaining a fixed inter-vehicle distance to the preceding vehicle, may be applied similarly. For example, in a case where inter-vehicle control is begun when the inter-vehicle distance falls to or below a set inter-vehicle distance (9 m, for example), it may be determined that the condition for anticipating a shift to inter-vehicle control has been established when a shift anticipation inter-vehicle distance (10 m, for example) that is larger than the set inter-vehicle distance serving as a control start condition is reached. The brake ECU 70 may obtain inter-vehicle distance information from an inter-vehicle distance control ECU, not shown in the drawing, for controlling the inter-vehicle distance. By supplying the valve opening current I3 to the isolation valve 60 in advance on the basis of prior information indicating a shift to specific vehicle travel control in this manner, highly responsive brake control can be realized when the shift to the vehicle travel control is actually performed.

Next, a fifth embodiment of the present invention will be described. This embodiment may be added to the first embodiment described above.

As shown in FIG. 1, the master cut valve 64 is disposed between the master channel 61 (constituting a "first hydraulic circuit") in which the simulator cut valve 68 is disposed and the main channel 45 (constituting a "second hydraulic circuit"). In this brake control, the reliability of normal control is secured by determining that an operation of the brake pedal 24 is underway when the hydraulic pressure of the two channels rises. As noted above, the master cylinder pressure of the master cylinder 32 and the regulator pressure of the regulator 33 are substantially equal, and therefore the hydraulic pressure in the master channel 61 is detected by the regulator pressure sensor 71. Meanwhile, the hydraulic pressure in the main channel 45 is detected by the control pressure sensor 73, as described above.

Figure 8A:
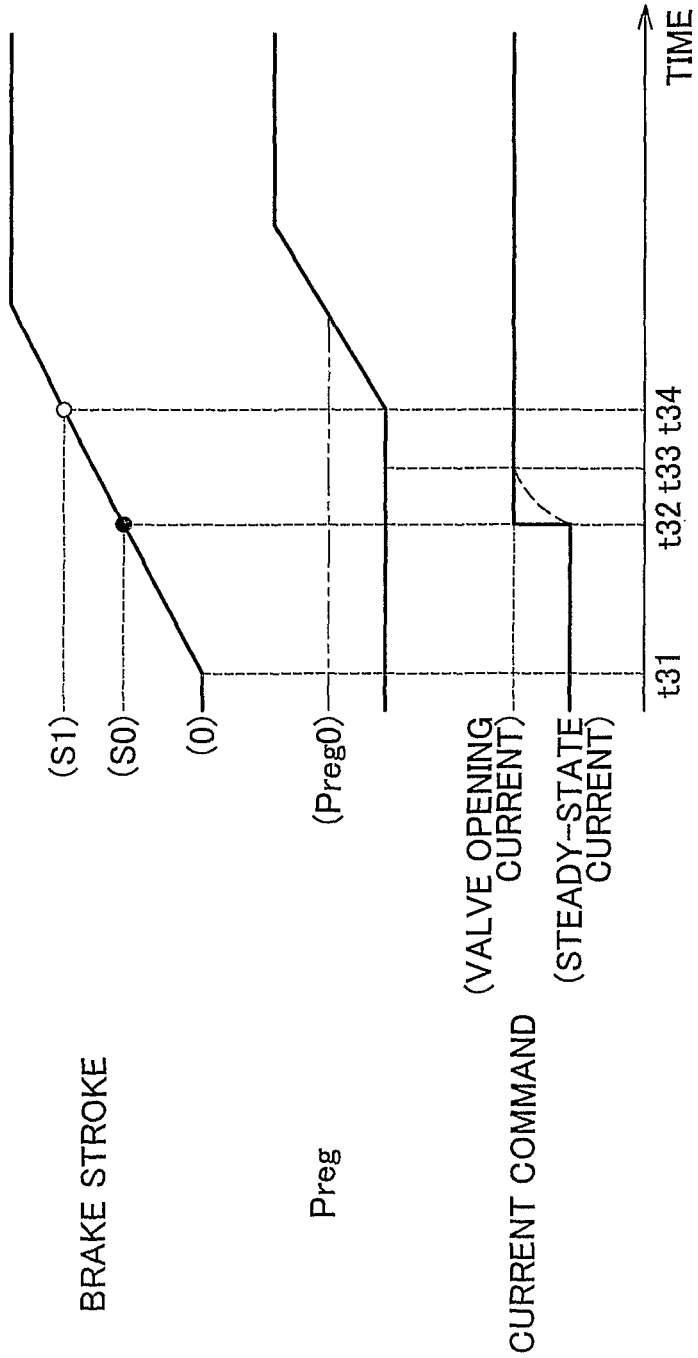
FIG. 8A is an illustrative view showing problems occurring when a valve opening current is applied in the first embodiment, in a case where a brake pedal is depressed normally.

FIGS. 8A and 8B are illustrative views showing problems occurring when the valve opening current is applied in the first embodiment. FIG. 8A illustrates a case in which the brake pedal 24 is depressed normally. FIG. 8B illustrates a case in which the brake pedal 24 is depressed rapidly. In each drawing, a brake stroke, a regulator pressure Preg, and a current command signal are shown in order from the upper section, while the abscissa represents the passage of time. Note that Preg0 in the drawings represents a master cylinder pressure at which the simulator cut valve 68 cannot open easily due to the front-rear differential pressure thereof, or in other words the regulator pressure at this time (to be referred to hereafter as a "limit regulator pressure").

During the normal period shown in FIG. 8A, it is determined that the brake pedal 24 has been depressed when the stroke sensor 25 detects a reference brake stroke S0 (7 mm, for example), and accordingly, the current is switched from the steady-state current I2 to the valve opening current I3. The reference brake stroke S0 takes a certain magnitude in consideration of play and the like in an operation of the brake pedal 24. For example, the brake pedal 24 is displaced by vibration and the like during vehicle driving, and the reference brake stroke S0 is set so as to cut this type of noise.

In the example shown in the drawing, the brake pedal 24 is depressed at a time t31, and at a time t32, the brake stroke reaches the reference brake stroke S0. Accordingly, a command signal for switching to the valve opening current I3 is output. In this case, as shown by the broken line in the drawing, a response delay exists in the actual current value, and therefore the valve opening current I3 is actually reached at a time t33. At this point in time, however, the regulator pressure Preg has not yet reached the limit regulator pressure Preg0, and therefore the front-rear differential pressure constituting valve opening resistance is not generated in the simulator cut valve 68. The regulator pressure Preg begins to rise from a subsequent time t34 when the brake stroke reaches S1 (10 mm, for example). Therefore, since the front-rear difference pressure of the simulator cut valve 68 is small, the valve opens immediately upon application of the valve opening current I3.

During rapid depression shown in FIG. 8B, on the other hand, the brake stroke rises more rapidly due to the rapid depression, and the regulator pressure Preg rises earlier in accordance therewith. Hence, when the current is switched to the valve opening current I3 at a time t35 at which the brake stroke reaches the reference brake stroke S0, the regulator pressure Preg exceeds the limit regulator pressure Preg0 at a time t36 when the valve opening current I3 is actually reached. As a result, the front-rear differential pressure of the simulator cut valve 68 increases such that the valve can no longer open.

FIG. 9 is an illustrative view showing electrification control according to the fifth embodiment. The drawing shows a case corresponding to FIG. 8B, in which the brake pedal 24 is depressed rapidly. The brake stroke, the regulator pressure Preg, and the current command signal are shown in order from the upper section of the drawing, and the abscissa represents the passage of time.

In this embodiment, as shown in the drawing, a determination reference for determining depression of the brake pedal 24 when rapid depression is performed is set at a brake stroke S2 (3 mm, for example) that is smaller than the reference brake stroke S0 serving as the determination reference during a normal period when rapid depression is not performed. Note that here, it is determined that rapid depression has been performed when temporal variation in the brake stroke immediately after depression of the brake pedal 24, temporal variation in the regulator pressure Preg, or similar is larger than a predetermined rapid depression determination reference value, for example.

As shown in the drawing, a command signal for switching to the valve opening current I3 is output at a time t42 when the brake stroke S2 is reached. In this case, as shown by the broken line in the drawing, the regulator pressure Preg remains below the limit regulator pressure Preg0 at a time t43 when the valve opening current I3 is actually reached, and therefore a front-rear differential pressure of a magnitude that makes opening difficult is not yet generated in the simulator cut valve 68. Therefore, the simulator cut valve 68 opens immediately upon application of the valve opening current I3.

Next, a sixth embodiment of the present invention will be described. This embodiment differs from the fifth embodiment in the condition for switching to the valve opening current, but may be added similarly to the first embodiment.

Typically, an increase in the hydraulic pressure of both the main channel 45 and the master channel 61 is used as a determination reference to detect depression of the brake pedal 24 with a high degree of precision. With this constitution, however, the hydraulic pressure of the main channel 45 rises more slowly than that of the master channel 61 due to the existence of the master cut valve 64. A particularly large relative increase in this time delay is exhibited when the brake pedal 24 is depressed rapidly. Hence, when an increase in the hydraulic pressure of the two channels is detected, the hydraulic pressure of the master channel 61 may have increased by a considerably large amount. The simulator cut valve 68 is a normally closed electromagnetic valve, the front-rear differential pressure of which serves as valve opening resistance, and therefore, when the master cylinder pressure rises excessively so as to exceed a pressure corresponding to the aforementioned limit regulator pressure Preg0, it may become impossible to open the simulator cut valve 68 even by applying the valve opening current I3. Hence, in this embodiment, an operation of the brake pedal 24 is determined earlier.

FIG. 10 is an illustrative view showing electrification control according to the sixth embodiment. The drawing shows a case corresponding to FIG. 9, in which the brake pedal 24 is depressed rapidly. The brake stroke, the regulator pressure Preg, and the current command signal are shown in order from the upper section of the drawing, and the abscissa represents the passage of time.

In this embodiment, as shown in the drawing, the rise time of the regulator pressure Preg is set as the determination reference for determining depression of the brake pedal 24. More specifically, in this embodiment, it is determined that the brake pedal 24 has been depressed when the hydraulic pressure of the master channel 61, which rises more quickly than that of the main channel 45, increases rather than the hydraulic pressure in both the main channel 45 and the master channel 61.

Here, a command signal for switching to the valve opening current I3 is output at a time t52, i.e. the rise time of the regulator pressure Preg substantially representing the master cylinder pressure. In this case, as shown by the broken line in the drawing, the regulator pressure Preg remains below the limit regulator pressure Preg0 at a time t53 when the valve opening current I3 is actually reached, and therefore a front-rear differential pressure of a magnitude that makes opening difficult is not yet generated in the simulator cut valve 68.

Therefore, the simulator cut valve 68 opens immediately upon application of the valve opening current I3.

The present invention is not limited to the embodiments described above, and various design modifications and the like may be added to the embodiments on the basis of the knowledge of a person skilled in the art. Embodiments to which such modifications have been added are included within the scope of the present invention.

For example, the fifth and sixth embodiments described above illustrate examples in which rapid depression is determined from the rate of change of the brake stroke, the rate of change of the regulator pressure Preg, and so on. In a modified example, the determination reference may be set as an increase in a specific hydraulic pressure, such as the regulator pressure or master cylinder pressure, beyond a reference pressure (atmospheric pressure, for example) at a smaller brake stroke (4 mm, for example) than the brake stroke S0 that serves as a determination reference during a normal brake operation. This determination reference is based on the fact that when rapid depression is performed, the hydraulic pressure rises more quickly than during a normal operation.

The embodiments described above illustrate examples in which the regulator pressure sensor 71 is provided such that the regulator pressure Preg is substituted for the master cylinder pressure, but instead, a sensor for detecting the master cylinder pressure itself may be provided.

In the embodiments described above, the simulator cut valve 68 and isolation valve 60 serve as examples of the switch valve, but similar processing may be applied to a switch valve such as the master cut valve 64 or the regulator cut valve 65, for example.

The invention claimed is:

1. A brake apparatus comprising:
a hydraulic pressure source that generates hydraulic pressure by pressurizing a working fluid in accordance with a manual operation of a brake operating member;
a wheel cylinder that applies a braking force to a wheel upon reception of a supply of the hydraulic pressure of the working fluid;
a hydraulic circuit that connects the hydraulic pressure source to the wheel cylinder and supplies the hydraulic pressure generated by the hydraulic pressure source to the wheel cylinder;
a switch valve that is disposed in the hydraulic circuit and opens and closes when a current is applied thereto so as to switch a flow of the working fluid through the hydraulic circuit;
a brake operation determination unit that determines a manual operation condition of the brake operating member; and
a control unit that performs control that:
applies a first activation current, which is required to start an open/close operation, to the switch valve,
applies a second steady-state current, which is lower than the first activation current, to maintain the open/close operation after the first activation current has been applied for a predetermined electrification period, and
when the brake operation determination unit determines that the brake operating member is in a manual operational condition during application of the second steady-state current, applies a third control securing current, which is higher than the second steady-state current, to the switch valve at a prior timing to a manual operation of the brake operating member corresponding to a normal operation determination reference.

2. The brake apparatus according to claim 1, wherein the control unit applies the first activation current as the third control securing current.

3. The brake apparatus according to claim 1, further comprising:
a brake operation detection unit that detects an operation state of the brake operating member, wherein
the brake operation determination unit determines whether or not the brake operating member is in the operational condition on the basis of information detected by the brake operation detection unit.

4. The brake apparatus according to claim 3, wherein the control unit performs control to apply the control securing current to the switch valve for a predetermined electrification period following the elapse of a preset setting period that starts from a point at which the brake operation detection unit detects that the brake operating member has shifted from an operative state to an inoperative state.

5. The brake apparatus according to claim 3, further comprising:
a stroke detection unit that detects a brake stroke indicating a depression amount of a brake pedal serving as the brake operating member, wherein
the control unit determines whether or not the brake pedal has been depressed rapidly during application of the second current on the basis of a preset rapid depression determination reference, and in a case where the brake pedal is determined to have been depressed rapidly, the control unit determines that the brake pedal is in the operational condition upon detection of a smaller brake stroke than that of a case in which rapid depression is not determined.

6. The brake apparatus according to claim 3, further comprising:
a first hydraulic circuit serving as the hydraulic circuit, which connects the hydraulic pressure source to the switch valve;
a first hydraulic pressure detection unit that detects a hydraulic pressure in the first hydraulic circuit;
a second hydraulic circuit that is connected at one end to the first hydraulic circuit side via a predetermined pressure reduction unit and connected at another end to the wheel cylinder side; and
a second hydraulic pressure detection unit that detects a hydraulic pressure in the second hydraulic circuit, wherein
the brake operation determination unit determines the operation condition of the brake operating member on the basis of detection information from both the first hydraulic pressure detection unit and the second hydraulic pressure detection unit when a hydraulic pressure rate of change detected by the first hydraulic pressure detection unit is equal to or smaller than a preset rapid depression determination reference value for determining whether or not a brake pedal serving as the brake operating member has been depressed rapidly, and determines the operation condition of the brake pedal on the basis of only the detection information of the first hydraulic pressure detection unit when the hydraulic pressure rate of change detected by the first hydraulic pressure detection unit is larger than the rapid depression determination reference value.

7. The brake apparatus according to claim 3, further comprising:
a first hydraulic circuit serving as the hydraulic circuit, which connects the hydraulic pressure source to the switch valve;

a first hydraulic pressure detection unit that detects a hydraulic pressure in the first hydraulic circuit;

a second hydraulic circuit that is connected at one end to the first hydraulic circuit side via a predetermined pressure reduction unit and connected at another end to the wheel cylinder side;

a second hydraulic pressure detection unit that detects a hydraulic pressure in the second hydraulic circuit; and a stroke detection unit that detects a brake stroke indicating a depression amount of a brake pedal serving as the brake operating member, wherein the brake operation determination unit determines that the brake pedal is in the manual operational condition when a preset reference brake stroke is detected and when the hydraulic pressure detected by the first hydraulic pressure detection unit is larger than a reference pressure.

8. The brake apparatus according to claim 1, further comprising:

an accelerator operation detection unit that detects an operation state of an accelerator operating member of a vehicle, wherein the brake operation determination unit determines that the brake operating member is in the operational condition when a shift from an operative state to an inoperative state is detected in the accelerator operating member.

9. The brake apparatus according to claim 1, wherein the control unit further performs control to after a second electrification period has elapsed, apply the second steady-state current to maintain the open/close operation.

10. A brake control apparatus that performs electrification control on a switch valve and is provided in a brake apparatus having a hydraulic pressure source that generates hydraulic pressure by pressurizing a working fluid in accordance with a manual operation of a brake operating member, a wheel cylinder that applies a braking force to a wheel upon reception of a supply of the hydraulic pressure of the working fluid, a hydraulic circuit that connects the hydraulic pressure source to the wheel cylinder and supplies the hydraulic pressure generated by the hydraulic pressure source to the wheel cylinder, and the switch valve, which is disposed in the hydraulic circuit and opens and closes when a current is applied thereto so as to switch a flow of the working fluid through the hydraulic circuit, the brake control apparatus comprising:

a brake operation determination unit that determines a manual operation condition of the brake operating member; and a control unit that performs control that:

applies a first activation current, which is required to start an open/close operation, to the switch valve, applies a second current, which is lower than the first activation current, to maintain the open/close operation after the first activation current has been applied for a predetermined electrification period, and when the brake operation determination unit determines that the brake operating member is in a manual operational condition during application of the second steady-state current, applies a third control securing current, which is higher than the second steady-state current, to the switch valve at a prior timing to a manual operation of the brake operating member corresponding to a normal operation determination reference.

11. The brake control apparatus according to claim 10, wherein the control unit applies the first activation current as the third control securing current.

12. The brake control apparatus according to claim 10, further comprising:

a brake operation detection unit that detects an operation state of the brake operating member, wherein the brake operation determination unit determines whether or not the brake operating member is in the operational condition on the basis of detection information from the brake operation detection unit.

13. The brake control apparatus according to claim 12, further comprising:

a stroke detection unit that detects a brake stroke indicating a depression amount of a brake pedal serving as the brake operating member, wherein the control unit determines whether or not the brake pedal has been depressed rapidly during application of the second current on the basis of a preset rapid depression determination reference, and in a case where the brake pedal is determined to have been depressed rapidly, the control unit determines that the brake pedal is in the operational condition upon detection of a smaller brake stroke than that of a case in which rapid depression is not determined.

14. The brake control apparatus according to claim 12, further comprising:

a first hydraulic circuit serving as the hydraulic circuit, which connects the hydraulic pressure source to the switch valve;

a first hydraulic pressure detection unit that detects a hydraulic pressure in the first hydraulic circuit;

a second hydraulic circuit that is connected at one end to the first hydraulic circuit side via a predetermined pressure reduction unit and connected at another end to the wheel cylinder side; and a second hydraulic pressure detection unit that detects a hydraulic pressure in the second hydraulic circuit, wherein the brake operation determination unit determines the operation condition of the brake operating member on the basis of detection information from both the first hydraulic pressure detection unit and the second hydraulic pressure detection unit when a hydraulic pressure rate of change detected by the first hydraulic pressure detection unit is equal to or smaller than a preset rapid depression determination reference value for determining whether or not a brake pedal serving as the brake operating member has been depressed rapidly, and determines the operation condition of the brake pedal on the basis of only the detection information of the first hydraulic pressure detection unit when the hydraulic pressure rate of change detected by the first hydraulic pressure detection unit is larger than the rapid depression determination reference value.

15. The brake control apparatus according to claim 12, further comprising:

a first hydraulic circuit serving as the hydraulic circuit, which connects the hydraulic pressure source to the switch valve;

a first hydraulic pressure detection unit that detects a hydraulic pressure in the first hydraulic circuit;

a second hydraulic circuit that is connected at one end to the first hydraulic circuit side via a predetermined pressure reduction unit and connected at another end to the wheel cylinder side;

a second hydraulic pressure detection unit that detects a hydraulic pressure in the second hydraulic circuit; and a stroke detection unit that detects a brake stroke indicating a depression amount of a brake pedal serving as the brake operating member, wherein the brake operation determination unit determines that the brake pedal is in the manual operational condition when a preset reference brake stroke is detected and when the hydraulic pressure detected by the first hydraulic pressure detection unit is larger than a reference pressure.

16. The brake control apparatus according to claim 10, further comprising:

an accelerator operation detection unit that detects an operation state of an accelerator operating member of a vehicle, wherein the brake operation determination unit determines that the brake operating member is in the operational condition when a shift from an operative state to an inoperative state is detected in the accelerator operating member.

17. A brake control method for controlling electrification of a switch valve disposed in a hydraulic circuit of a brake apparatus on the basis of a manual operation of a brake operating member to switch a flow of a working fluid through the hydraulic circuit, the method comprising:

applying a first activation current, which is required to start an open/close operation, to the switch valve during driving of a vehicle;

applying a second steady-state current, which is lower than the first activation current, to maintain the open/close operation of the switch valve after application of the first activation current for a predetermined electrification period; and applying a third control securing current, which is higher than the second steady-state current, to the switch valve for a preset time period at a prior timing to a manual operation of the brake operating member corresponding to a normal operation determination reference, when the brake operating member is determined to be in a manual operational condition during application of the second steady-state current.

18. The brake control method according to claim 17, wherein the first activation current is applied as the third control securing current.

19. The brake control method according to claim 17, further comprising:

detecting a manual operation state of the brake operating member; and determining whether or not the brake operating member is in the manual operational condition on the basis of the detected information.

20. The brake control method according to claim 19, further comprising:

performing control to apply the control securing current to the switch valve for a predetermined electrification period following the elapse of a preset setting period that starts from a point at which the brake operating member is detected to have shifted from an operative state to an inoperative state.

21. The brake control method according to claim 19, further comprising:

detecting a brake stroke indicating a depression amount of a brake pedal serving as the brake operating member; and determining whether or not the brake pedal has been depressed rapidly during application of the second current on the basis of a preset rapid depression determination reference, and in a case where the brake pedal is determined to have been depressed rapidly, determining that the brake pedal is in the operational condition upon detection of a smaller brake stroke than that of a case in which rapid depression is not determined.

22. The brake control method according to claim 19, further comprising:

detecting a hydraulic pressure of a first hydraulic circuit that connects the hydraulic pressure source for generating hydraulic pressure to the switch valve;

detecting a hydraulic pressure of a second hydraulic circuit that is connected at one end to the first hydraulic circuit side via a predetermined pressure reduction unit and connected at another end to the wheel cylinder side; and determining the operation condition of the brake operating member on the basis of detection information relating to both the hydraulic pressure of the first hydraulic circuit and the hydraulic pressure of the second hydraulic circuit when a hydraulic pressure rate of change in the detected hydraulic pressure of the first hydraulic circuit is equal to or smaller than a preset rapid depression determination reference value for determining whether or not a brake pedal serving as the brake operating member has been depressed rapidly, and determining the operation condition of the brake pedal on the basis of only the hydraulic pressure of the first hydraulic circuit when the hydraulic pressure rate of change of the first hydraulic circuit is larger than the rapid depression determination reference value.

23. The brake control method according to claim 19, further comprising:

detecting a hydraulic pressure of a first hydraulic circuit that connects the hydraulic pressure source for generating hydraulic pressure to the switch valve;

detecting a hydraulic pressure of a second hydraulic circuit that is connected at one end to the first hydraulic circuit side via a predetermined pressure reduction unit and connected at another end to the wheel cylinder side;

detecting a brake stroke indicating a depression amount of a brake pedal serving as the brake operating member; and determining that the brake pedal is in the manual operational condition when a preset reference brake stroke is detected and the detected hydraulic pressure of the first hydraulic circuit is larger than a reference pressure.

24. The brake control method according to claim 17, further comprising:

detecting an operation state of an accelerator operating member of a vehicle; and determining that the brake operating member is in the operational condition when a shift from an operative state to an inoperative state is detected in the accelerator operating member.

25. A brake control method for controlling electrification of a switch valve disposed in a hydraulic circuit of a brake apparatus on the basis of a manual operation of a brake operating member to switch a flow of a working fluid through the hydraulic circuit, the method comprising:

applying a first activation current, which is required to start an open/close operation, to the switch valve during driving of a vehicle;

applying a second steady-state current, which is lower than the first activation current, to maintain the open/close operation of the switch valve after application of the first activation current for a predetermined electrification period; and applying a third control securing current, which is higher than the second steady-state current, to the switch valve for a preset time period at a prior timing to an actual operation of the specific vehicle travel control, when a preset shift anticipation condition for anticipating a shift to specific vehicle travel control performed in tandem with manual braking control of the vehicle is established during application of the second steady-state current.

26. The brake control method according to claim 25, wherein the first activation current is applied as the third control securing current.

* * * * *